United States Patent [19]

Ezawa et al.

[11] Patent Number: 5,467,156
[45] Date of Patent: Nov. 14, 1995

[54] CAMERA HAVING DIFFERENT SUPPLY MODES SELECTABLE FOR A FILM

[75] Inventors: Akira Ezawa, Tokyo; Koichi Daitoku, Sagamihara; Hideya Inoue, Yokohama; Kazuyuki Kazami; Kazuto Ohtsuka, both of Tokyo, all of Japan

[73] Assignee: Nikon Corporation, Tokyo, Japan

[21] Appl. No.: 322,369

[22] Filed: Oct. 13, 1994

Related U.S. Application Data

[63] Continuation of Ser. No. 154,400, Nov. 18, 1993, abandoned, which is a continuation of Ser. No. 942,366, Sep. 9, 1992, abandoned, which is a continuation of Ser. No. 884,225, May 11, 1992, abandoned, which is a continuation of Ser. No. 784,646, Oct. 28, 1991, abandoned, which is a continuation of Ser. No. 622,559, Dec. 5, 1990, abandoned.

[30] Foreign Application Priority Data

Dec. 8, 1989 [JP] Japan ..................................... 1-317805
Jan. 18, 1990 [JP] Japan ..................................... 2-011067

[51] Int. Cl.⁶ ..................................................... G03B 7/00
[52] U.S. Cl. ............................................. 354/21; 354/173.1
[58] Field of Search ................................. 354/21, 173.1, 354/173.11, 217

[56] References Cited

U.S. PATENT DOCUMENTS 4,460,256 7/1985 Araki et al. ..................... 354/173.11
4,864,332 9/1989 Harvey .................................. 354/21
5,006,873 4/1991 Wash ................................. 354/106

FOREIGN PATENT DOCUMENTS 62-201423 9/1987 Japan.
1-233431 9/1989 Japan.

*Primary Examiner*—David M. Gray
*Attorney, Agent, or Firm*—Shapiro and Shapiro

[57] ABSTRACT

This invention relates to cameras operable to select one film supply system from either a normal wind-up system or a preparatory wind-up system. The camera has a selector switch for selecting one of the film supply systems, and an inhibiting means for inhibiting that the two systems are applied to one film by the switch, a write means for recording selected information onto a film or a storage device provided in the cartridge, and a read means for reading the selected information and the frame information written in the device. The switch selects a film supply system which is indicated by the selected information read out from the device of the loaded film by the read means. Additionally, a film supply means is provided for preparing and supplying the film in accordance with the frame information read out by the read means. The film supply means can wind up the film to supply even when either of the two film supply systems is set. The selection of the film supply system can be changed by the switch only before the first frame is photographed. A counter is provided for inhibit that the first frame of the film is supplied to the photographing position more than predetermined times in response to the change in the film supply system selected by the switch.

48 Claims, 22 Drawing Sheets

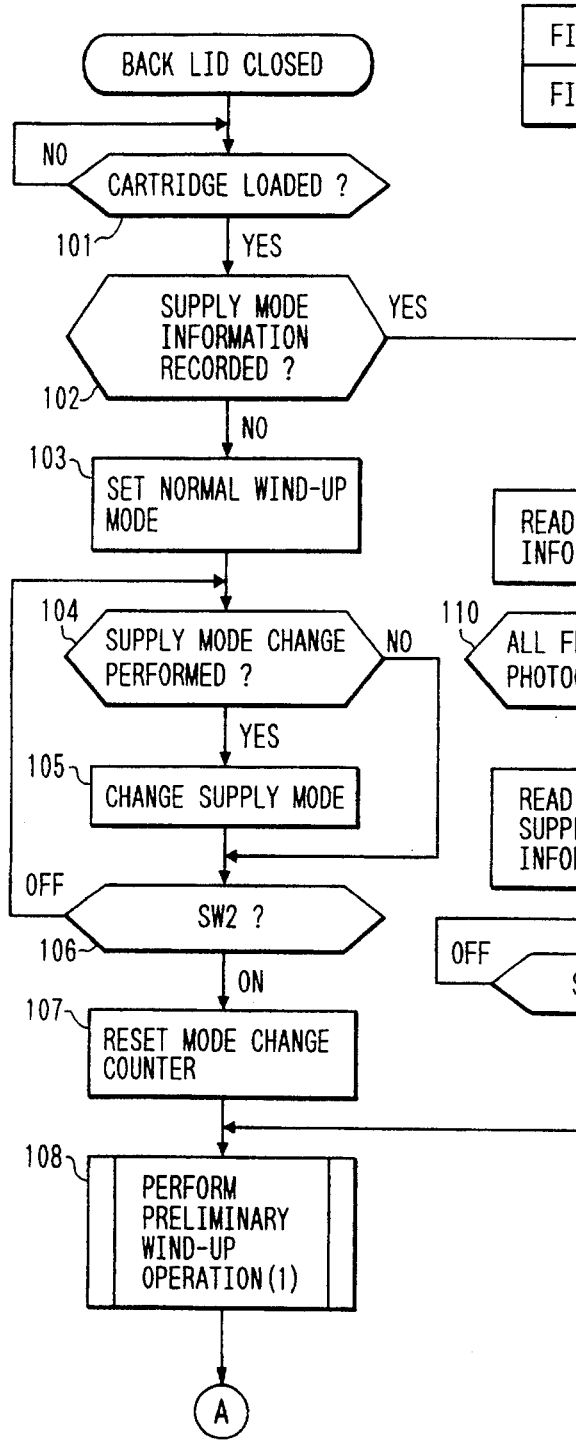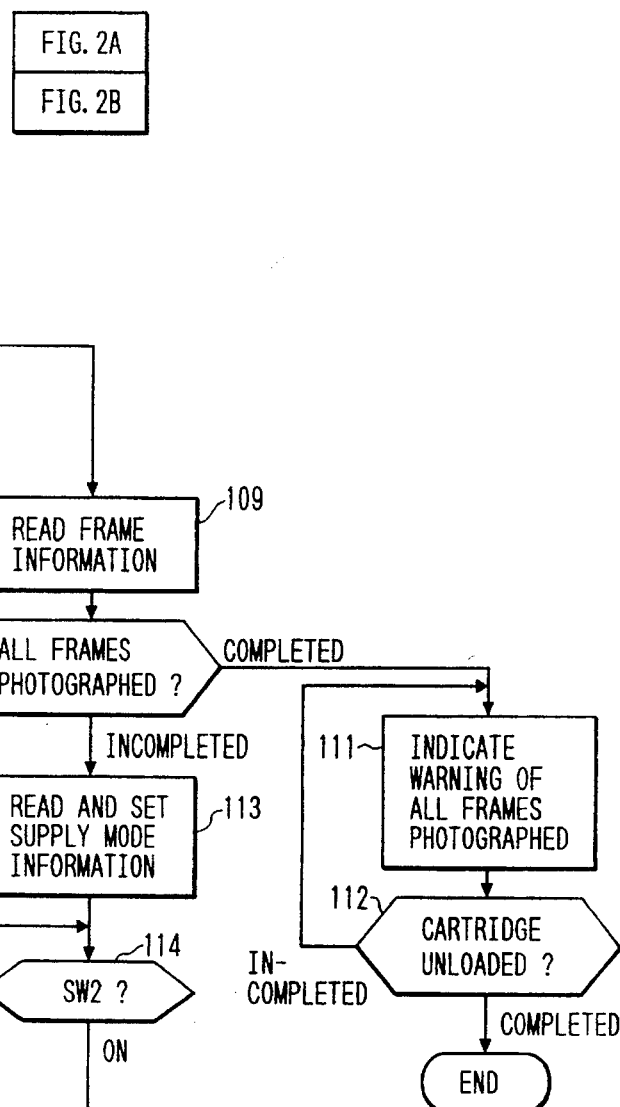
FIG. 2A
FIG. 2

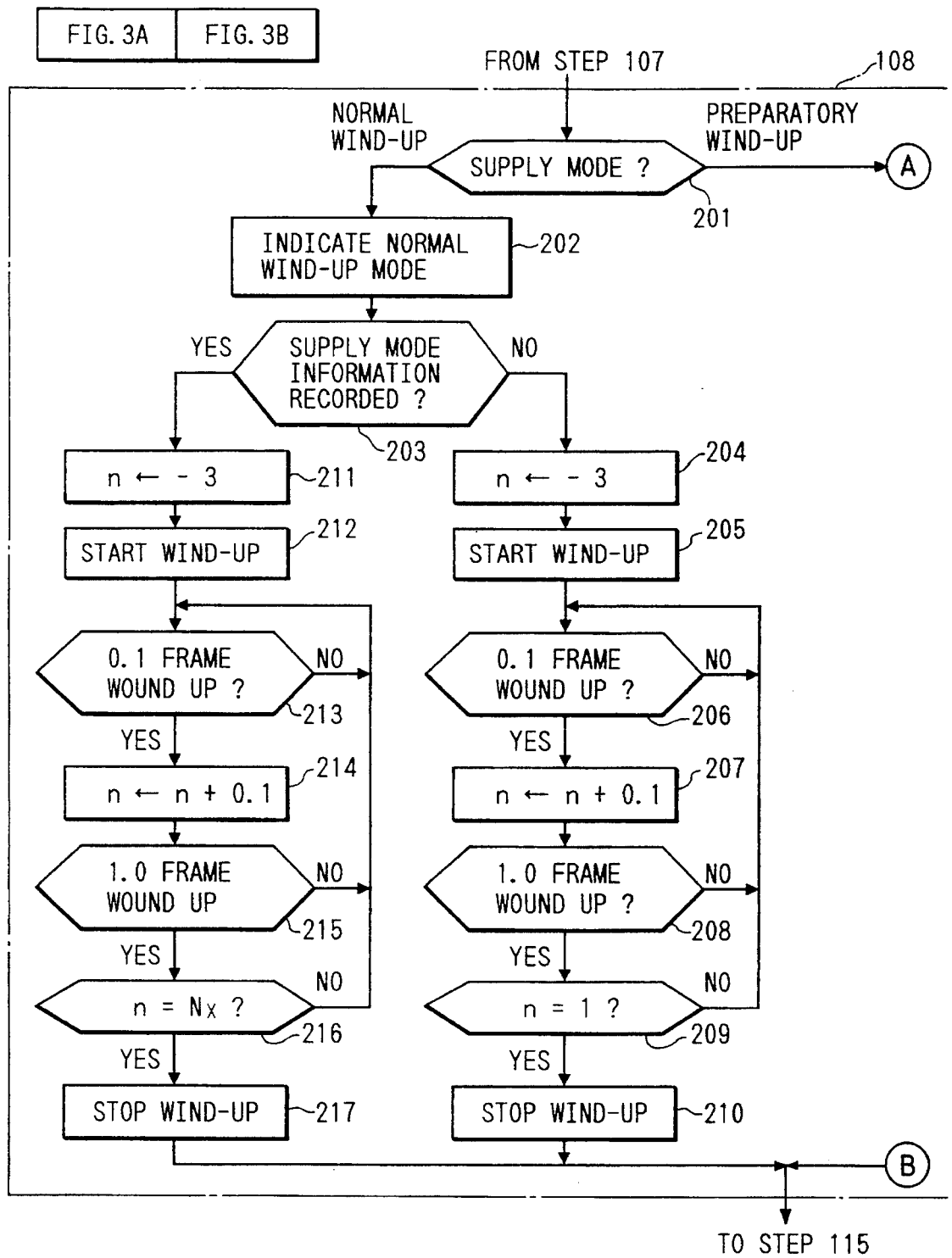

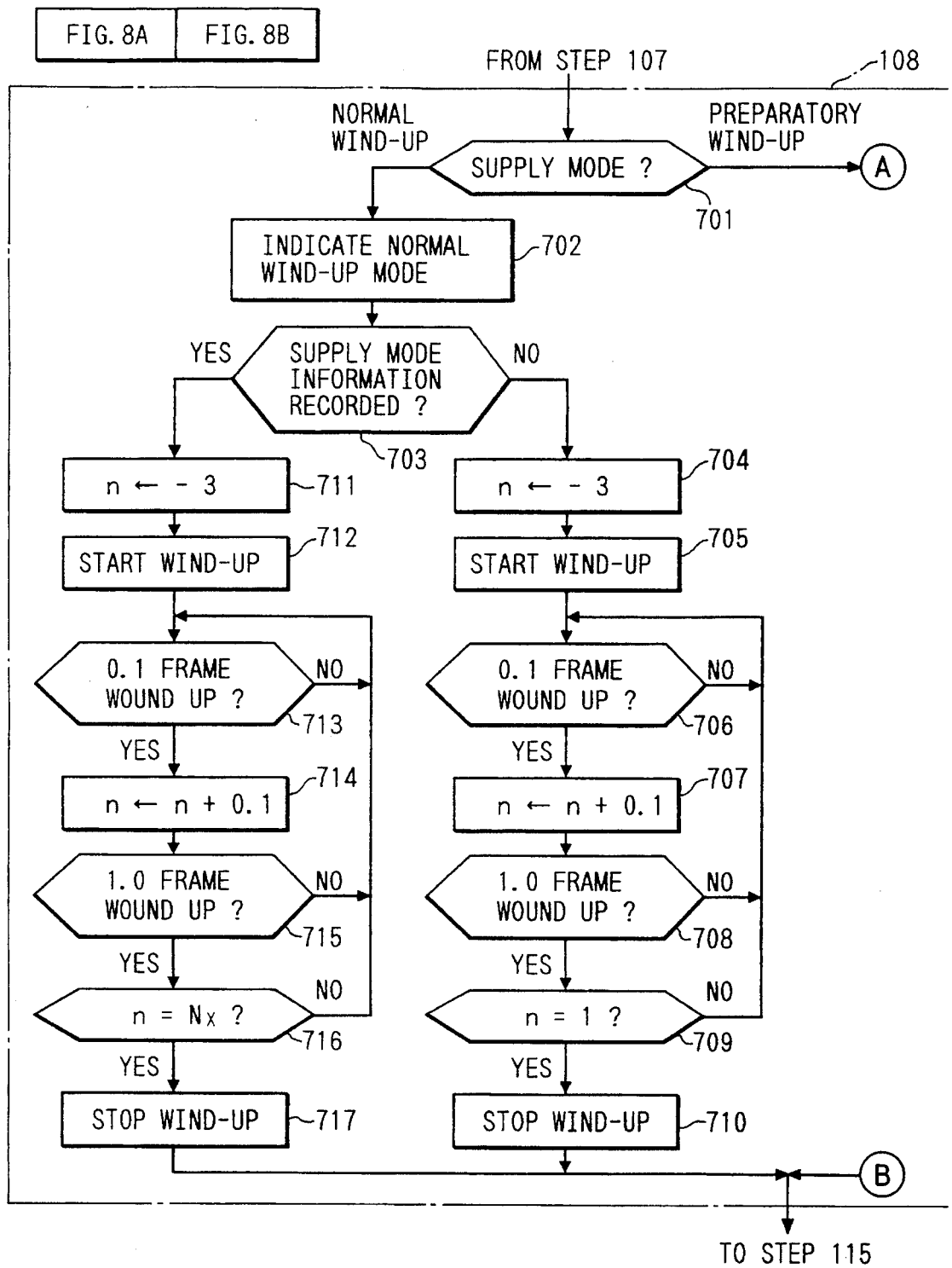

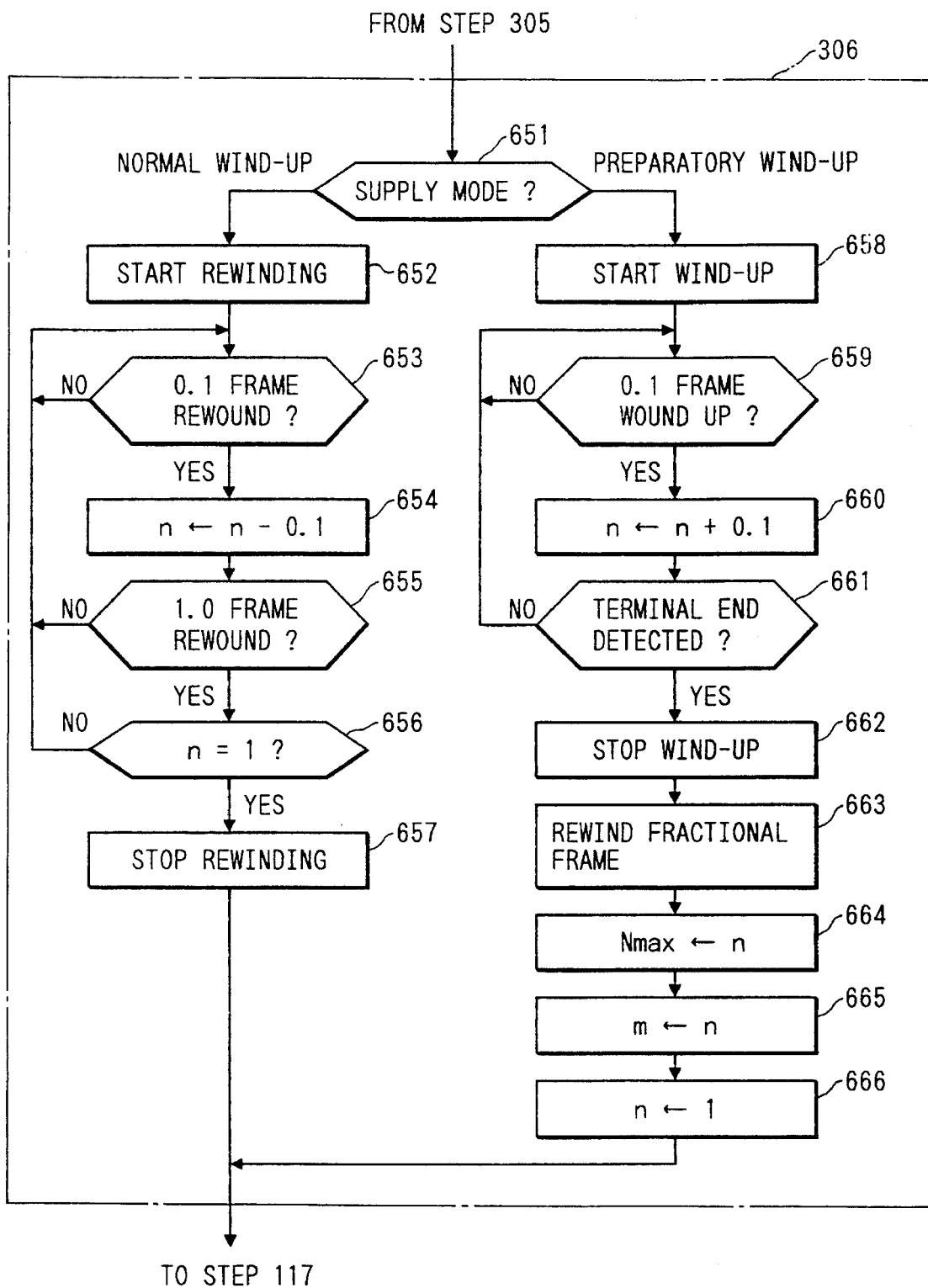

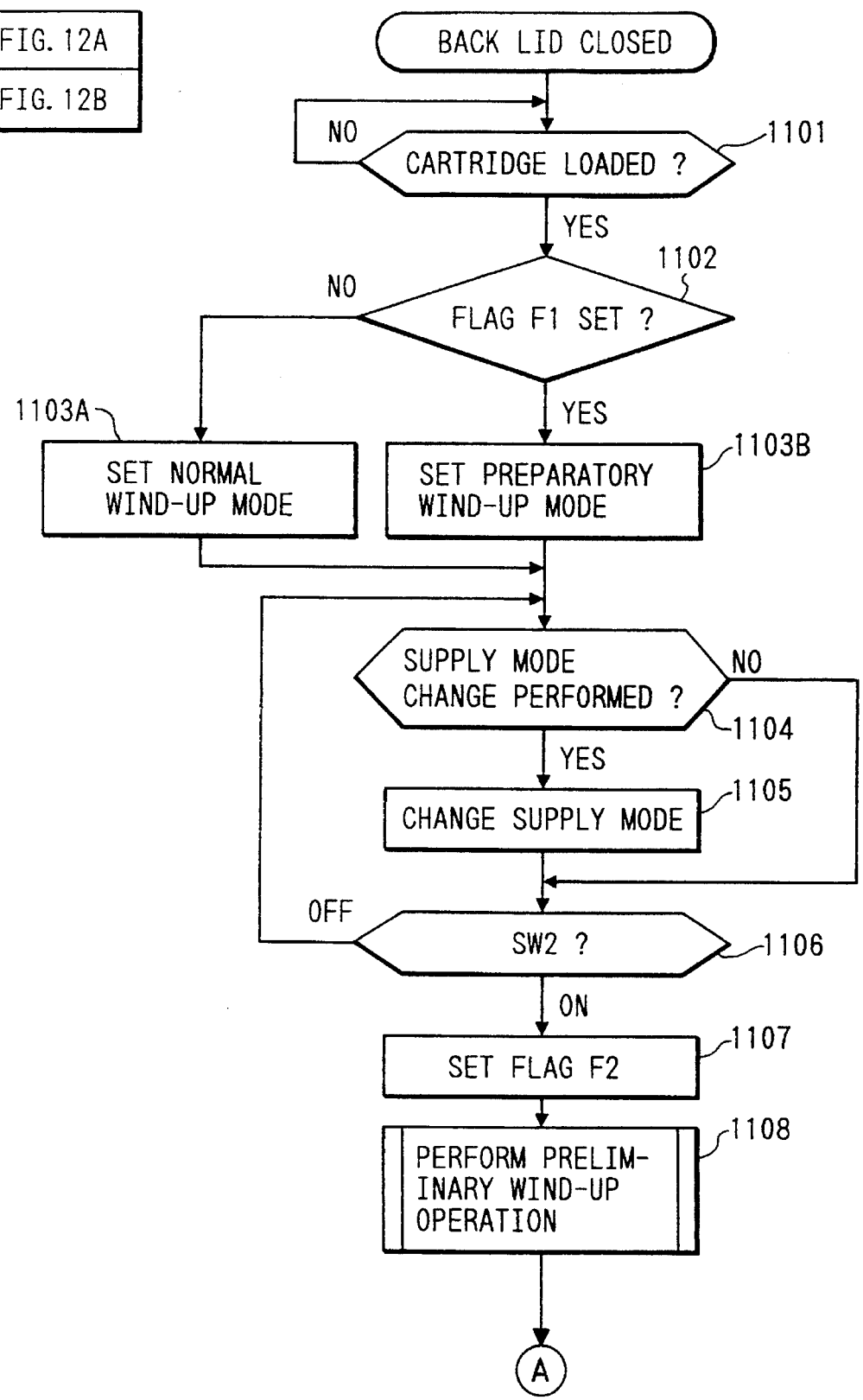

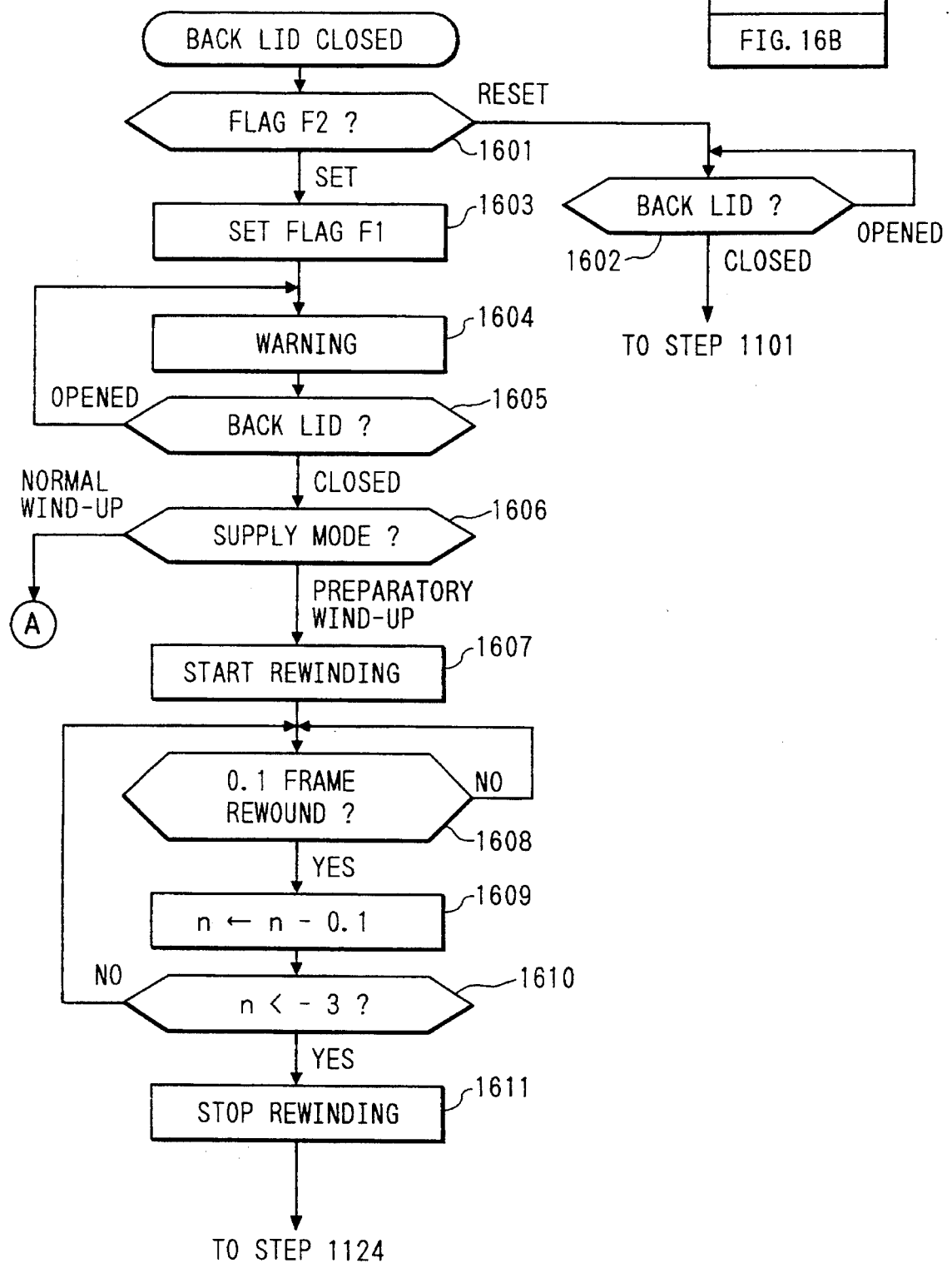
FIG. 16A
FIG. 16
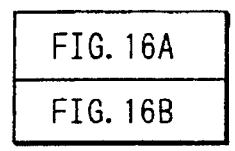

CAMERA HAVING DIFFERENT SUPPLY MODES SELECTABLE FOR A FILM

This is a continuation of application Ser. No. 08/154,400 filed Nov. 18, 1993, which is a continuation of application Ser. No. 07/942,366 filed Sep. 9, 1992, which is a continuation of application Ser. No. 07/884,225 filed May 11, 1992, which is a continuation of application Ser. No. 07/784,646 filed Oct. 28, 1991, which is a continuation of application Ser. No. 07/622,559 filed Dec. 5, 1990, all of which are abandoned.

BACKGROUND OF THE INVENTION

1. Field of the Invention

This invention relates to, in general, cameras utilizing roll film cartridges, hereinafter, called "cartridges" and, more particularly, to cameras operable to select one film supply system from either a normal wind-up system or a preparatory wind-up system.

2. Related Background Art

Conventionally, in cameras with the use of cartridges, there is a normal wind-up system generally employed as a film supply system. This is a system in which frame feeding is provided by drawing out a roll film in sequence from a cartridge. On the other hand, a film supply system as described in U.S. Pat. No. 4,460,256 has been proposed other than this wind-up system. This system is called "Preparatory wind-up system" or "Pre-winding system", in which frame feeding is carried out by taking up a roll film in sequence from a cartridge after preparatory wind-up operation, that is, the film for all frames is drawn out from the cartridge at first and taken up onto a spool automatically when the cartridge is loaded into the camera.

SUMMARY OF THE INVENTION

This invention is to provide an easily manipulatable camera having a normal wind-up system and a preparatory wind-up system.

This invention includes a selector means for selecting one film supply system from either a normal wind-up system or a preparatory wind-up system, and an inhibit means for inhibiting that the two systems comprising the normal wind-up system and the preparatory wind-up system are applied to one film by the selector means.

Additionally, the invention includes a selector means and a write means for recording selected information, which is indicative of a film supply system selected by the selector means, onto a film or a storage means provided in the cartridge that contains the film.

The invention also includes a selector means, a write means, and a read means for reading selected information and frame information written in a storage means. The selector means selects a film supply system which is indicated by the selected information read out from the storage means of a loaded film by the read means. Additionally, a film supply means is provided for preparing and supplying the film in accordance with the frame information read out by the read means. The film supply means can wind up the film to supply even when either of the two film supply systems is set.

It is possible to change the selection of the film supply system by the selector means only before the first frame is photographed. An inhibit means is provided for inhibit that the first frame of the film is supplied to the photographing position more than predetermined times in response to the change in the film supply system selected by the selector means.

A preferred film supply system can be arbitrary selected by selecting either the normal wind-up system or the preparatory wind-up system, and it is inhibited that the two systems of the normal wind-up system and the preparatory wind-up system applied to one film by the selector means, whereby the different film supply systems are not applied to the same film.

Selected information indicative of a selected film supply system is recorded onto the film or the storage means provided in the cartridge in which the film is contained, whereby it is possible to select the film supply system based on the selected information read out from the storage means.

Selected information indicative of a selected film supply system and frame information is recorded in the storage means, and the selected information and the frame information written in the storage means is read out, whereby even after a cartridge of which all frames have not been completely photographed yet, was once unloaded, the film supply system used at the time of photographing can be selected to supply the same frame at the time of photographing to the photographing position when the cartridge is loaded again.

It is possible to change the selection of the film supply system only before the first frame is photographed, whereby it can be avoided that different film supply systems are applied to one film. Additionally, it is inhibited that the first frame of the film is supplied to the photographing position more than predetermined times in response to the change in the film supply system selected by the selector means, whereby the film can be prevented from scratches caused by the film supply operations endlessly performed.

BRIEF DESCRIPTION OF THE DRAWINGS

FIGS. 2, 2A and 2B are main flow charts common to the first and second embodiments, FIGS. 3, 3A, 3B, 4, 5, 5A, 5B, 6, and 7 are flow charts for the subroutines in the first embodiment, FIGS. 8, 8A, 8B, 9, 9A, 9B, 10, and 11 are flow charts for the subroutines in the second embodiment of the invention, FIGS. 12, 12A and 12B are main flow charts of the improved example of the invention, FIGS. 16, 16A and 16B are flow charts illustrating a part of operation in the improved example of the invention.

DESCRIPTION OF THE REFERRED EMBODIMENT

Figure 1:
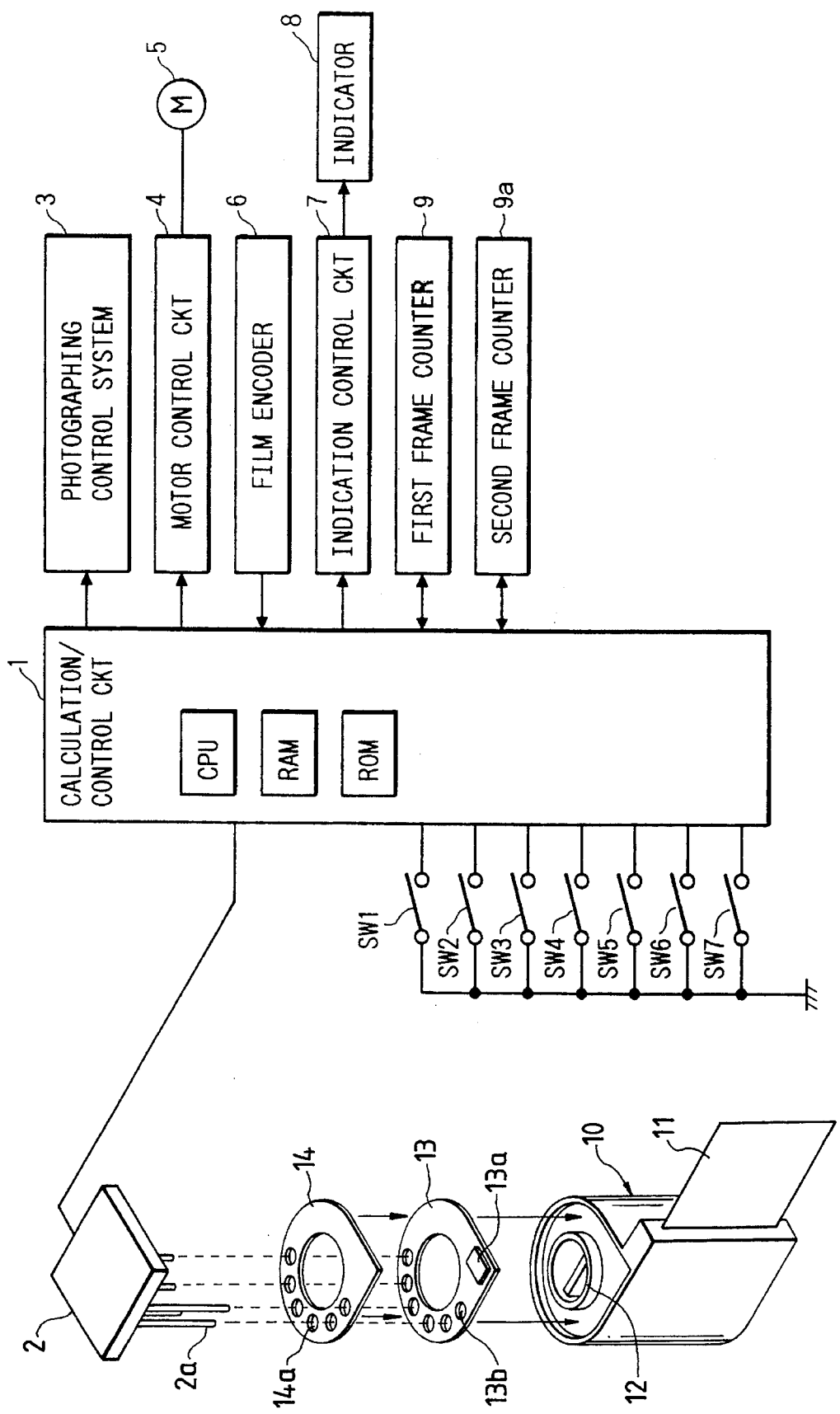
FIG. 1 is a block diagram illustrating the configuration of a camera accordance with the invention.

FIG. 1 is a structural view showing an embodiment of a camera in accordance with the invention.

Referring to FIG. 1, a calculation/control circuit 1 has CPU, RAM, and ROM for controlling each component as described hereinafter. An information write/read device 2, which is operable to write/read information into/from a storage means provided in a cartridge, has a contact pin 2a for connecting with the storage means. A photographing control system 3 is provided for executing a shutter release control, an iris control, a photometry operation control, and a range-finding operation control. A motor control circuit 4 is provided for controlling a motor (M) 5 to perform wind-up operation and rewinding for a film. A film encoder 6 is provided for detecting the feeding amount of a film. This film encoder may be actualized by well known methods such as a photo-coupler by which perforations are counted and the rotation of a free sprocket moving in cooperate with a film is detected. An indicator control circuit 7 is provided for allowing an indicator 8 to indicate the type of film supply systems, the number of frames, and warning. A first frame counter 9 is provided to count the number of frames in response to the feeding of the film detected by the film encoder 6. The first frame counter 9 indicates which frame from the leader portion of a film, faces a lens and is in exposure standby state, or which frame from the position adjacent to the end portion fixed on the spool 12 in the cartridge 10, faces the lens and is in exposure standby state, so that the number of frames counted by the first frame counter 9 is indicated on the indicator 8 in real time. A second frame counter 9a, which will be described in detail hereinafter, is used to count the number of frames other than the first frame counter 9.

The state of a film supply systems is called "supply mode", generally the normal wind-up system is called "normal wind-up mode" and the preparatory wind-up system is called "preparatory wind-up mode".

A main switch SW1 is provided to apply power source for the camera, and SW2 is the half-depressed switch of a release button, SW3 is the full-depressed switch of a release button. A mode change switch SW4 is provided to select a film supply system, so that normal wind-up mode or preparatory wind-up mode is indicated alternately on the indicator 8 in each time SW4 is pressed. A rewind switch SW5 is provided to direct for the rewinding the film. A back lid switch SW6 is provided to be ON when the lid is closed, and a cartridge loaded switch SW7 is provided to be ON when a cartridge is loaded in the cartridge holder of the camera.

A cartridge 10 containing a film 11, has a spool 12 for taking up the film 11, and a memory board 13. The memory board is provided with $E^2$ PROM 13a which is a storage means to store supply mode information and frame information therein, and a plurality of contacts 13b connected to I/O pins (not shown) of $E^2$ PROM 13a. A lid 14 holding the memory board 13 between itself and the upper portion of the cartridge 10 has a plurality of holes 14a in correspond to each position of contact points 13b in the memory board 13. Information write/read device 2 and $E^2$ PROM 13a are configured to be connected each other, such that the contact pins 2a for the information write/read device 2 contact with the contact points 13b after extending through into the holes 14a when the cartridge 10 is loaded into the cartridge holder of the camera.

Information recorded in $E^2$ PROM 13a will be described in a concrete way.

(1) Supply mode information

It is configured in 2-bit so as to identify 3 types for each state as described below.

1) [00]: Supply mode information not recorded
2) [01]: Normal wind-up system
3) [10]: Preparatory wind-up system (2) Frame information The frame information is indicated in numeric data Nx and indicates which frame from the leader portion of the film faces the lens on completion of photographing immediately before the cartridge is unloaded from the camera, and includes also the information of all frames photographed to indicate that all frames were completely photographed. For instance, if all frames of a film are 36, it will be expressed by $2^5<36<2^6$, so the data portion for the number of the frames may be configured by 6-bit. As a method to indicate the completion of photographing for all frames, for instance, it can be configured such that the completion of photographing for all frames is indicated when all of the 6-bit of numeric data Nx mentioned above are [1], however, as an alternate method, adding 1 bit more to the 6-bit may be employed to indicate the completion of photographing for all frames.

It can be recognized by the data of frame information Nx indicating the first frame that the supply mode has not been recorded yet, so it may be possible to configure supply mode information with only 1 bit without indicating that supply mode information has not been recorded.

The operation of the camera as mentioned above will be described with reference to the flow chart. However, 2 types of embodiments are described depending on the manner of indication systems for frames counted by the first frame counter 9.

There are two types of indication systems, one is a count-up type in which a numeric value indicated on the indicator 8 of the camera is added up 1, 2, 3, . . . , to n for each photographing (n is the total number of frames), and another one is a count-down type in which a numeric value indicated on the indicator 8 of the camera are subtracted from n, n–1, n–2, . . . , 2, 1 for each photographing. The count-up type is advantageous in that an operator can know how many frames were photographed so far easily, and the count-down type is advantageous in that an operator can know how many frames will be photographed now on easily.

In the first embodiment, the count-up type is used in normal wind-up mode and the subtracting type is used in preparatory wind-up mode. In this case, an operator tends to confuse the meaning of the number indicated by the first frame counter, since the directions for counting frames in normal wind-up mode and preparatory wind-up mode are completely opposite each other. In the second embodiment, such a draw-back mentioned above can be eliminated, since the count-up type is always used independent of the film supply mode.

When a way of counting for the frames of the film is different depending on normal wind-up mode and preparatory wind-up mode, if the total frames are n, the frames are counted, in turn, first frame, second frame, . . . (n–1)th frame, and nth frame, from the leader portion of the film in normal wind-up mode. On the other hand, in preparatory mode, frames are counted, in turn, first frame, second frame, . . . , (n–1)th frame, and nth frame, from the position adjacent to the end portion fixed on the spool 12.

The first embodiment

The first embodiment will be described with reference to the main flow chart in FIG. 2.

It starts when a main switch SW1 is ON and a back lid switch SW6 is ON switched by closing the back lid of the camera. At first, whether a cartridge 10 was loaded in the cartridge holder of the camera or not is detected (step 101) by a cartridge loaded switch SW7, and when the presence of the cartridge 10 is detected, the supply mode information of $E^2$ PROM 13a is read to discriminate whether any supply mode was recorded or not (step 102), and it is a film of which at least a part of the frames was photographed when supply mode information has been recorded and it is a new film when supply mode information has not been recorded. Normal wind-up mode is set in RAM as the supply mode when the film is new (step 103). Then, a mode change switch SW4 is operated to discriminate whether supply mode change was performed or not (step 104), and if the change operation was performed, then it will go to step 106, and if it was not performed, then the supply mode is changed (step 105). Then, it is discriminated whether a half-depressed switch SW2 was depressed or not, i.e., whether to confirm the supply mode or not (step 106). The supply mode can be reset repeatedly, since steps from 104 to 106 are repeated until the supply mode is confirmed by depressing the half-depressed switch SW2. If preferred mode is normal wind-up mode, there is no need to reset. A mode change counter is reset (step 107) to go to preliminary wind-up operation (1) in step 108 when the half-depressed switch SW2 is depressed in step 106.

The mode change counter as mentioned above is used to inhibit an operation moving a film to the position where its first frame faces the lens is performed more than predetermined times in response to supply mode change. Namely, when one supply mode is set, a first frame is moved to the position facing a lens to prepare for photographing, however, it is possible to change the supply mode before the first frame is exposed. Therefore, when supply mode is changed, wind-up operation or rewinding for almost the full length of the film is performed to move a first frame to the position facing the lens in response to the supply mode changed as mentioned above. If such change is performed endlessly, film supply operations may scratch on the film. In order to avoid such undesirable situation, changeable times for supply mode are set to predetermined values, up to twice, for instance, after the preparation for the first frame to be photographed is completed, so as to inhibit changes in the supply mode more than predetermined times. Namely, the mode change counter is used to count how many times the supply mode is changed after the preparation for the first frame to be photographed is completed.

However, supply mode change can be performed without limitation in steps 104 to 106 as described above, before the preparation for the first frame to be photographed is completed.

In step 102, if it is discriminated that supply mode was recorded, it will be appreciated that a film, of which at least one frame was photographed, has been loaded. Frame information from $E^2$ PROM 13a is read (step 109), and whether photographing for all frames was completed or not is discriminated in response to the data of the completion of photographing all frames included in the frame information read (step 110). If the photographing was completed, the warning of all frames photographed is indicated on the indicator 8 (step 111), and whether the cartridge unloaded is detected by the cartridge loaded switch SW7 or not is discriminated (step 112), and if the cartridge was unloaded, then the operation ends, and if it was not unloaded, then it will go back to step 111.

In step 110, if photographing for all frames is incomplete, then supply mode information recorded in $E^2$ PROM 13a is read and supply mode is set in accordance with the supply mode information (step 113), and whether a half-depressed switch SW2 was depressed or not is discriminated (step 114), and if the switch is ON, then it will go to step 108. There is no problems in operation even if the step 114 is omitted.

Figure 4:
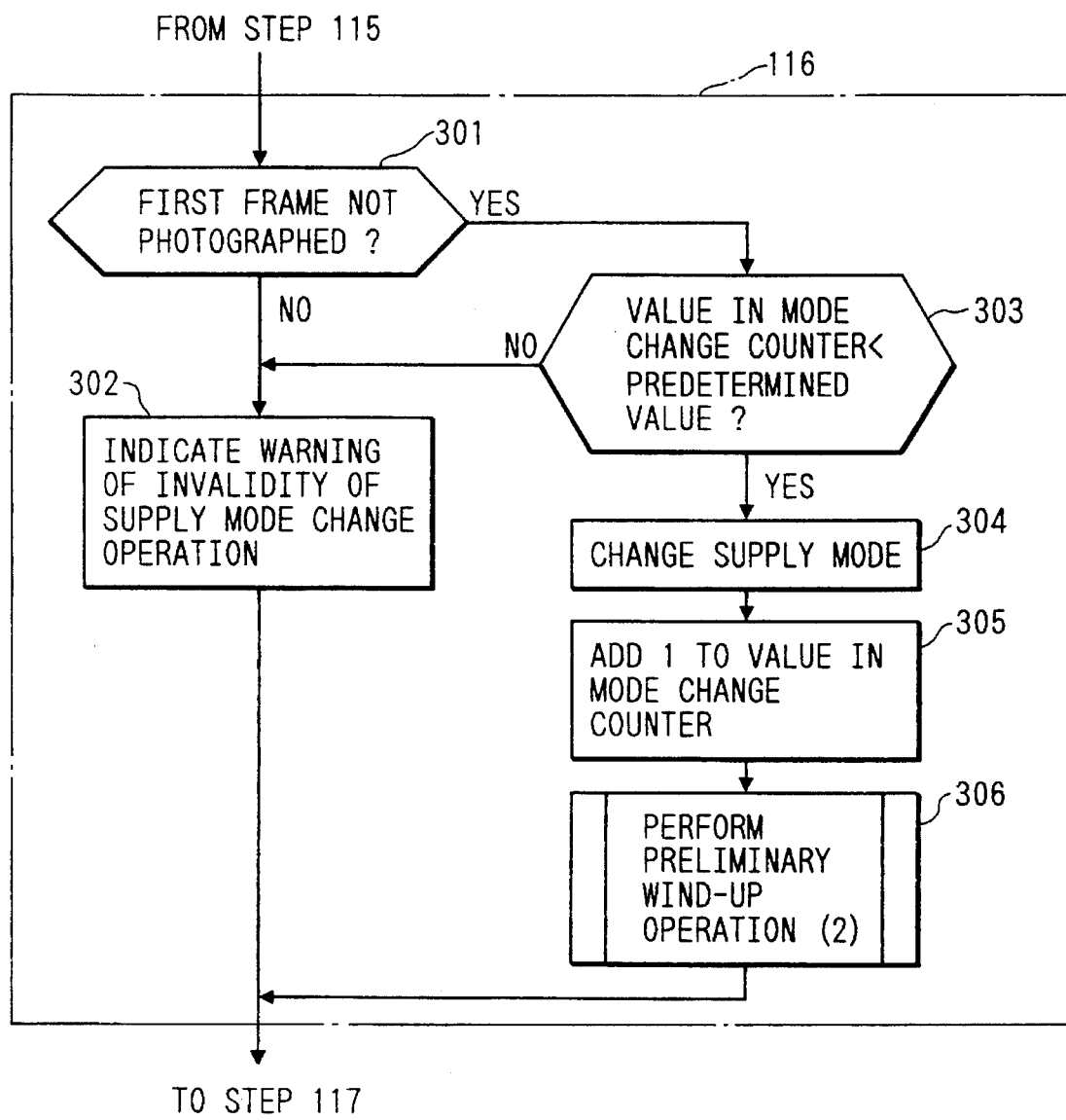
Figures 5, 5A:
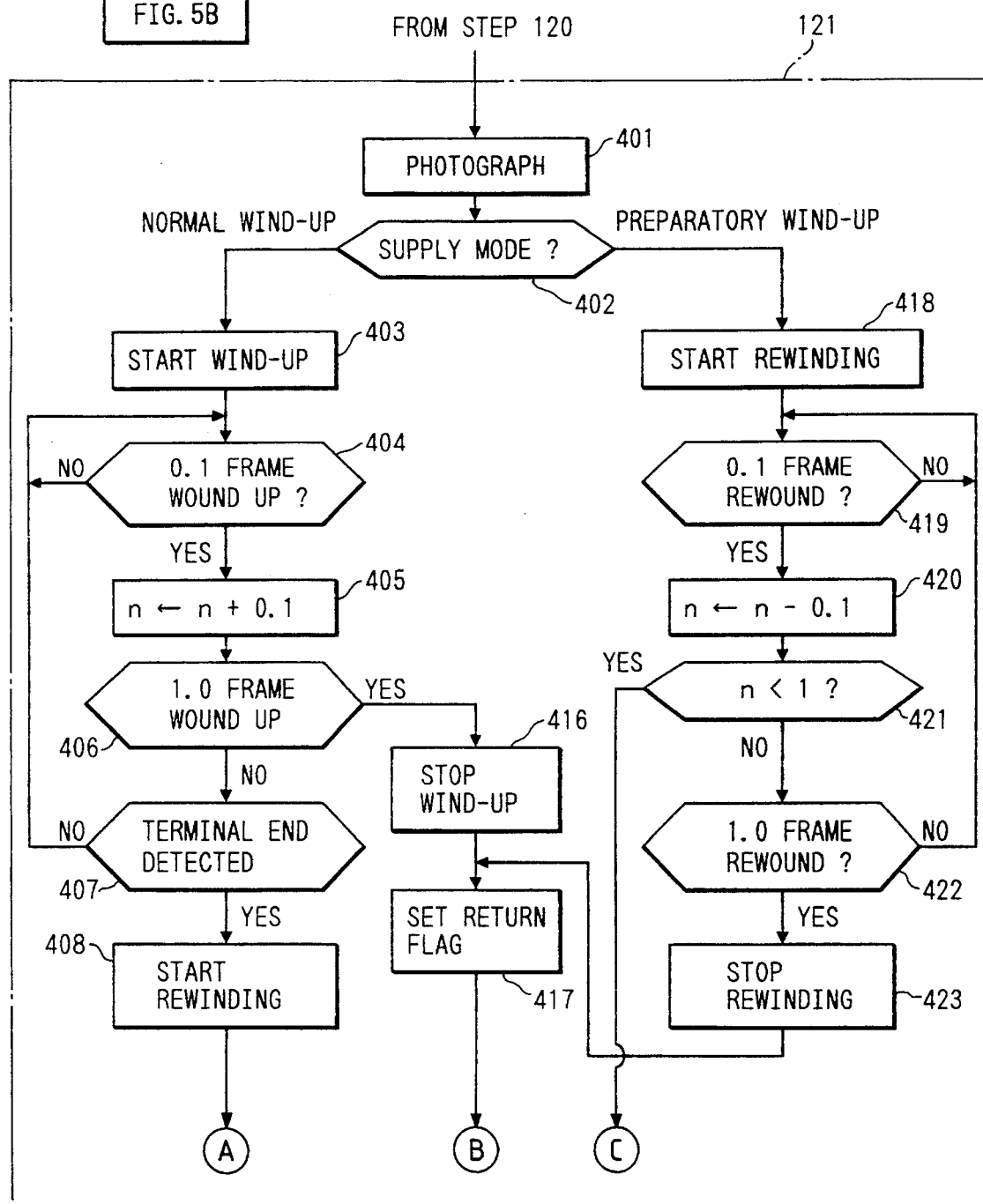
Figure 5B:
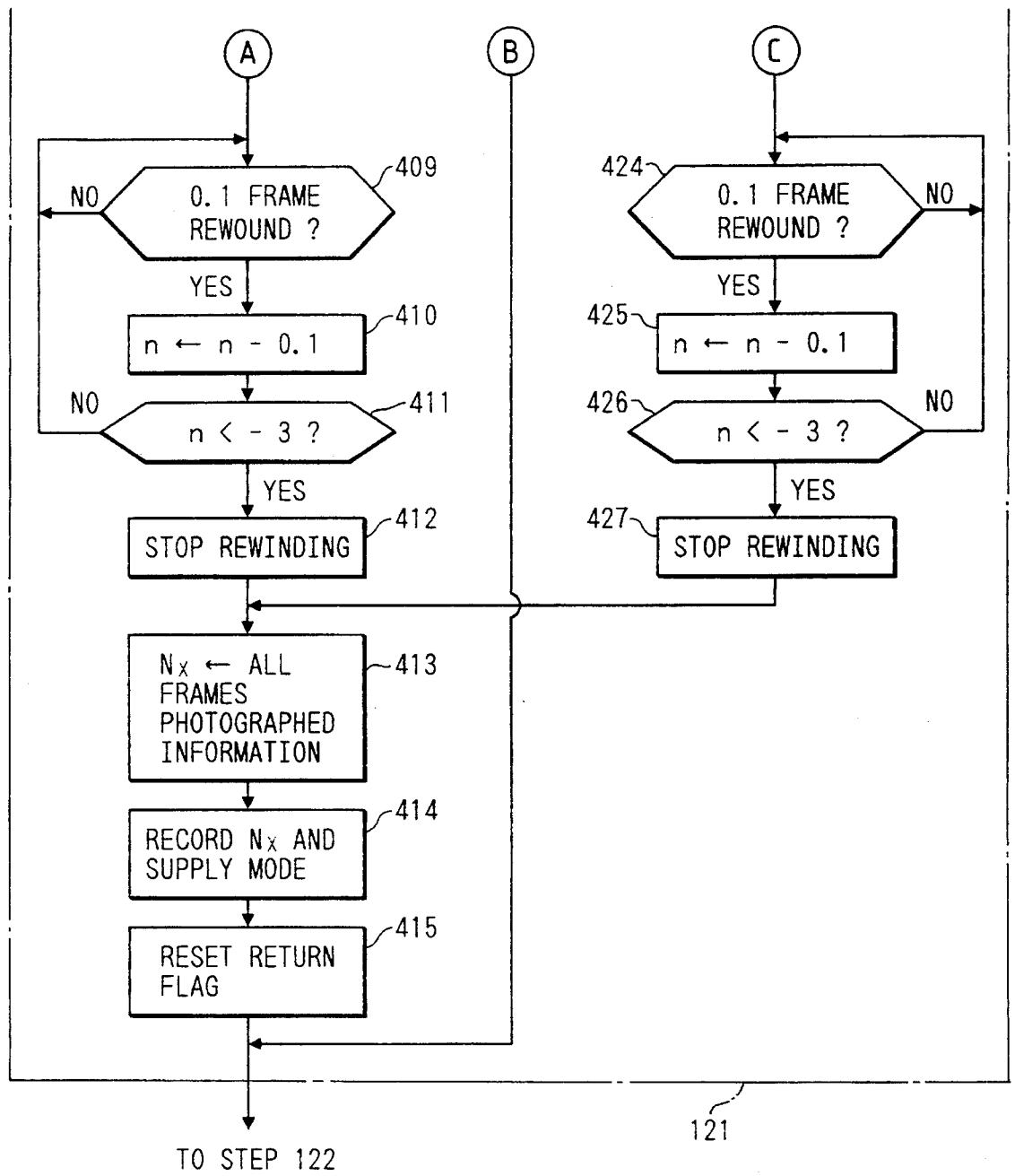

Preliminary wind-up operation (1) is performed to move a film to the first frame for a new film or to the next frame to be photographed for a film which is not new, in response to supply mode set (step 108). This operation will be described in detail in FIG. 3. Then, whether the change operation of supply mode was performed or not is discriminated (step 115), and if the change operation was not performed, then whether a rewind switch SW5 was operated or not is discriminated (step 117), and if the change operation was performed, then it will go to step 117 through supply mode change operation (step 116) which will be described in detail in FIG. 4, whether the rewind switch SW5 is ON or OFF is discriminated (step 117), and if the switch is ON, then it will go to step 124 through midway rewinding (step 123) illustrated by the subroutine, and if the switch is OFF, then whether a half-depressed switch SW2 is ON or OFF is discriminated (step 118), and if the switch is OFF, then it will go back to step 115, and if the switch is ON, photometry operation and range-finding operation are performed by a photographing control system (step 119). Then, whether a full depressed switch SW3 is ON or OFF is discriminated (step 120), and if the switch if OFF, then it will go back to step 115, and if the switch is ON, then whether the return flag as shown in FIG. 5 was set or reset through full depressed operation (step 121) illustrated by the subroutine is discriminated (step 122), and if the flag was set, then it will go back to step 115, and if the flag was reset, then the warning of the completion of rewinding is indicated on the indicator 8 to advise an operator to unload the cartridge (step 124). Whether unloading a cartridge was completed or not is discriminated by the ON or OFF state of the cartridge loaded switch SW7 (step 125), and if it was completed, then the operation ends, and when incomplete, then it will go back to step 124.

Figure 3B:
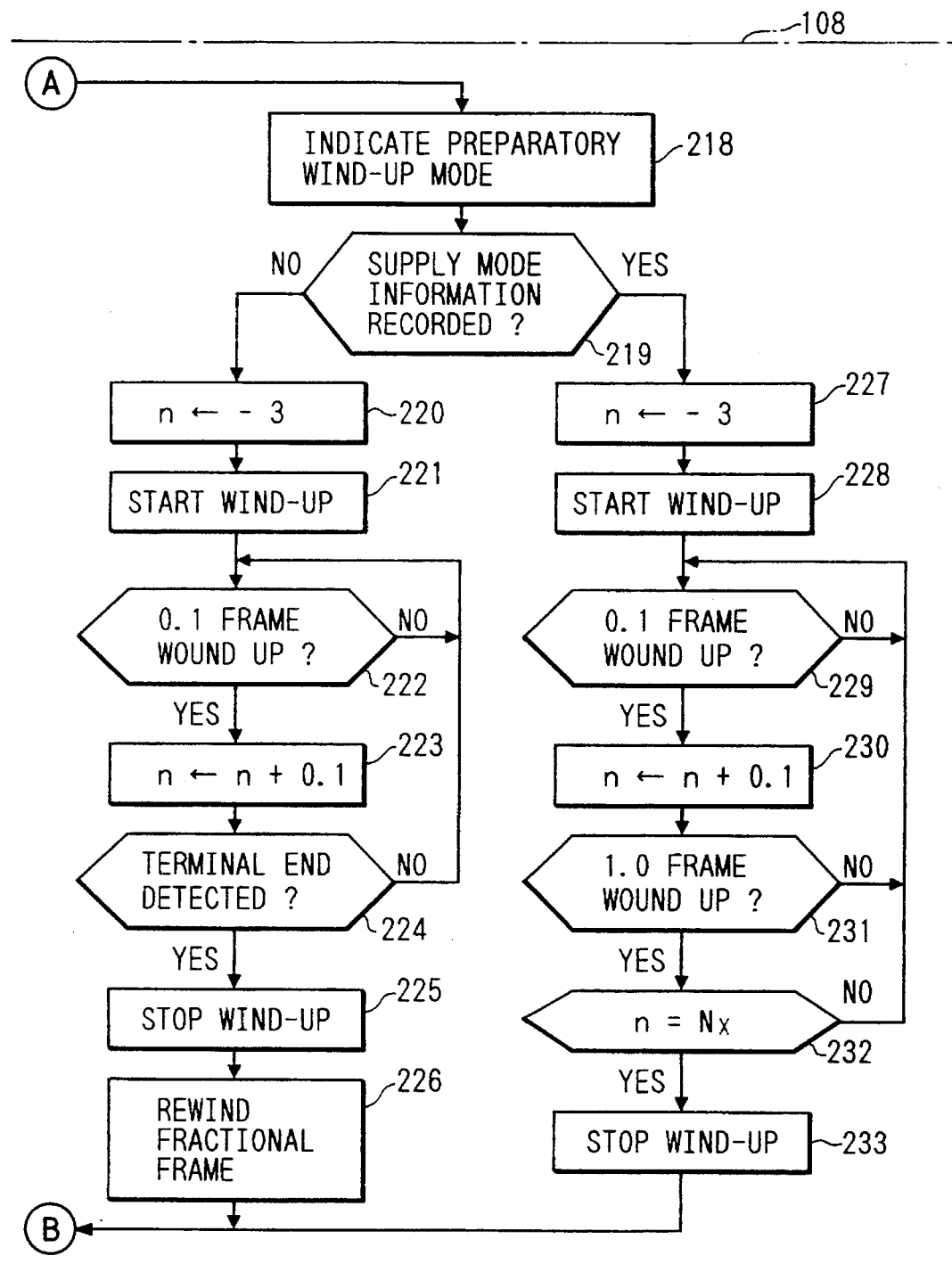

Preliminary wind-up operation (1) in step 108 in the first embodiment will be described with reference to the flow chart in FIG. 3. This preliminary wind-up operation (1) is performed for the preparation of photographing by winding up a film in response to supply mode.

The supply mode confirmed by step 106 or 114 is discriminated (step 201), and if the supply mode is normal wind-up mode, then normal supply mode is indicated on the indicator 8 (step 202). Whether supply mode information was recorded in $E^2$ PROM 13a or not is discriminated (step 203), and if there is no recorded, then the value of the first frame counter is set to a value −3 (step 204). This value −3 means that the leader portion of the film to be supplied without photographing, equals to 4 frames in length. Wind-up operation for the film starts (step 205), and whether 0.1 frame was wound up or not is discriminated (step 206), and if it is [N], then it will go back to step 206, and if it is [Y], then whether the value n equals to a value 1 or not is discriminated (step 209), and if it is [Y], then the wind-up operation stops (step 210). As a result, the first frame of the film is set to the position facing the lens.

In step 203, when there is supply mode information recorded, namely, if the film of the cartridge is a midway use, similarly in steps 204 to 208, wind-up operation is performed (steps 211 to 215), and then whether the result n equals to the number of frames Nx or not is discriminated (step 216), and if it is [N], then it will go back to step 213, and if it is [Y], then the wind-up operation stops (step 217). As a result, the frame corresponding to the number of frames Nx for the frame information recorded in $E^2$ PROM 13a, is set to the position facing the lens.

In step 201, supply mode is preparatory wind-up mode, preparatory wind-up mode is indicated (step 218), and whether supply mode information was recorded in $E^2$ PROM 13a or not is discriminated (step 219), and if there is no record, then the value of the first frame counter 9 is set to a value −3 (step 220), and the wind-up operation of the film starts (step 221). Whether 0.1 frame was wound up or not is discriminated (step 222), and if it is [N], then it will go back to step 222, and if it is [Y], then a value 0.1 is added to the value n (step 223) and whether the film was wound up to its terminal end or not is discriminated (step 224), and if it is [N], then it will go back to step 222, and if it is [Y], then the wind-up operation stops (step 225). Rewinding starts for the fractional frame of the film (equals to a portion of frames n less than the first decimal place) supplied by the film wind-up operation (step 226). As a result, the frame corresponding to the last frame of the film is set to the position facing the lens. The discrimination of the film terminal end in step 224 may be performed by a well known detection means which can detect the tension occurred on a film.

In step 219, when supply mode information was recorded, namely, when the film of the cartridge loaded is a midway use, similarly in steps 220 to 223, wind-up operation is performed (steps 228 to 230), and then whether 1.0 frame was wound up or not is discriminated (step 231), and if it is [N], then it will go back to step 229, and if it is [Y], then whether the value n equals to the number of frames Nx for the frame information or not is discriminated (step 232). If it is [N] in step 232, then it will go back to step 229, and if it is [Y], then the wind-up operation stops (step 233). As a result, the frame corresponding to the number of frames Nx for the frame information recorded in $E^2$ PROM 13a, is set to the position facing the lens.

Supply mode change operation in the step 116 will be described with reference to the flow chart in FIG. 4. This operation is performed in order to change supply mode while one supply mode has been already set and the first frame of the film has been also set to the position facing the lens.

At first, whether the first frame was not photographed or photographed (step 301) is discriminated, and if it is [N], then the supply mode should not be changed, so the supply mode change operation performed in step 115 is nullified and the warning of the invalidity of the supply mode change operation is indicated on the indicator 8 (step 302), and if it is [Y], then whether the mode change counter is less than a predetermined value or not is discriminated (step 303), and if it is [N], then further supply mode change is inhibited, such that it will go to step 302 where the warning of invalidity of supply mode change operation is indicated, and if it is [Y], then a supply mode is newly set based on the change operation of the supply mode performed in step 115 (step 304), and a value 1 is added to the value of the mode change counter (step 305), and preliminary wind-up operation (2) is performed in response to the supply mode newly set in step 304, and then it will go to step 117. The preliminary wind-up operation (2) in step 306 for the first and second embodiments is different for each, therefore, the first embodiment will be described with reference to FIG. 7 and the second embodiment will be described later with reference to FIG. 11.

Figure 7:
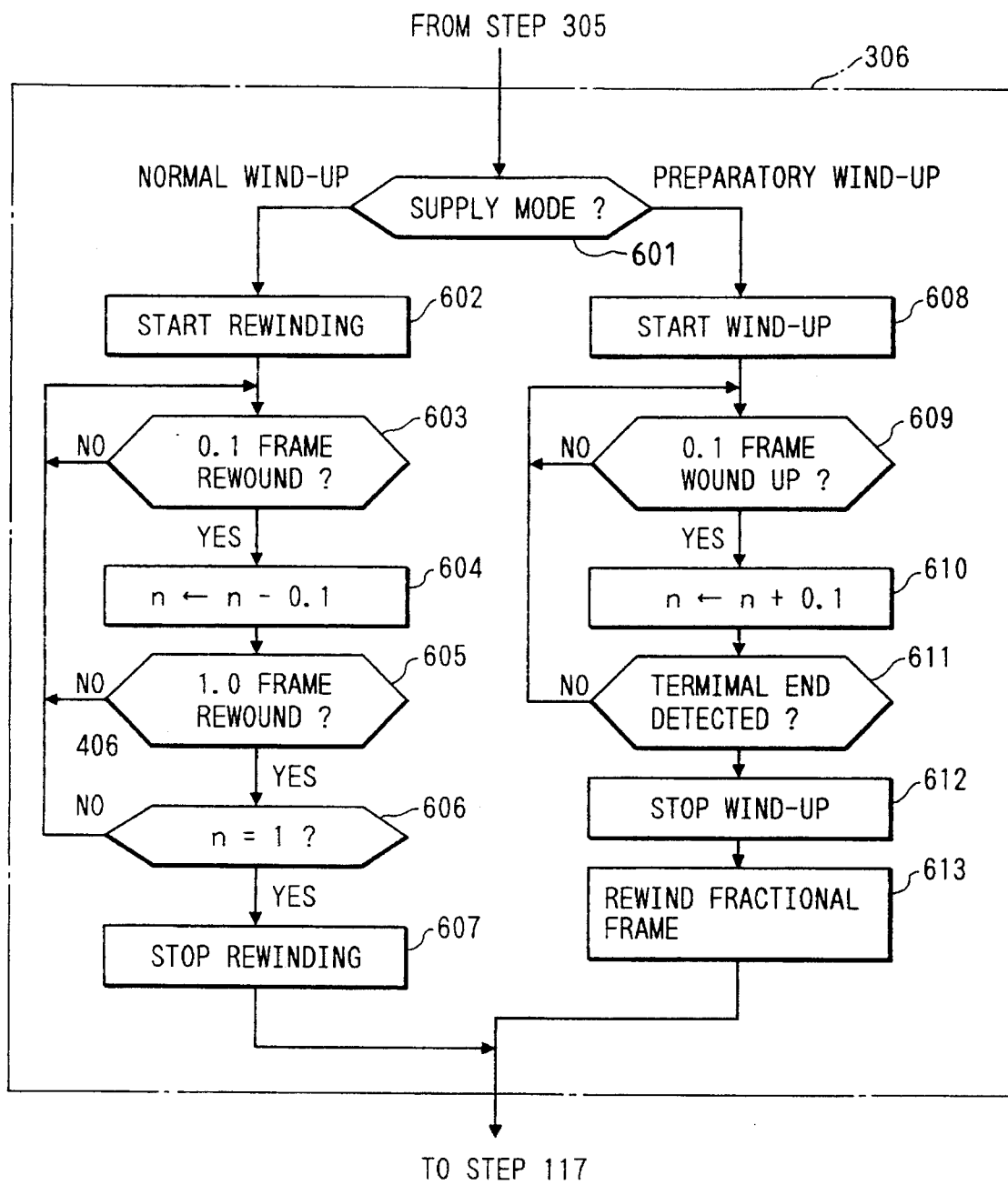

Preliminary wind-up operation (2) corresponding to the first embodiment will be described with reference to FIG. 7. The preliminary wind-up operation (2) is performed to set the first frame of the film to the position facing the lens in response to the change in supply mode performed by the aforementioned supply mode change operation.

At first, whether the supply mode newly set is normal wind-up mode or preparatory wind-up mode is discriminated (step 601), and if it is the normal wind-up mode, then rewinding for the film starts (step 602). Whether 0.1 frame was rewound or not is discriminated (step 603), and if it is [N], then it will go back to step 603, and if it is [Y], then value 0.1 is subtracted from the value n of the first frame counter 9 (step 604). Whether 1.0 frame was rewound or not is discriminated (step 605), and if it is [N], then it will go back to step 603, and if it is [Y], then whether the value n equals a value 1 or not is discriminated (step 606), and if it is [N], then it will go back to step 603, and if it is [Y], then the rewinding stops and the first frame of the film is set to the position facing the lens (step 607), and then it will go to step 117.

In step 601, supply mode newly set is preparatory wind-up mode, then wind-up operation for the film starts (step 608). Whether 0.1 frame was wound up or not is discriminated (step 609), and if it is [N], then it will go back to step 609, and if it is [Y], then a value 0.1 is added to the value n of the first frame counter 9 (step 610). Whether the film terminal end was detected or not is discriminated (step 611), and if it is [N], then it will go back to step 609, and if it is [Y], then the wind-up operation stops (step 612), and the fractional frame is rewound and the last frame of the film is set to the position facing the lens (step 613), and then it will go to step 117.

The full-depressed operation in step 121 as mentioned above will be described with reference to FIG. 5. Operation associated with photographing and frame feeding, is performed in the full-depressed operation.

At first, the full-depressed switch SW3 is depressed ON in the previous step 120, then exposure operation is performed (step 401), and whether supply mode is normal wind-up mode or preparatory wind-up mode is discriminated (402), and if the supply mode is the normal wind-up mode, then wind-up operation for the film starts (step 403). Whether 0.1 frame was wound up or not is discriminated (step 404), and if it is [N], then it will go back to step 404, and if it is [Y], then a value 0.1 is added to the value n of the first frame counter 9 (step 405). Whether 1.0 frame was wound up or not is discriminated (step 406), and if it is [Y], then the wind-up operation stops (step 416) and a return flag is set (step 417), and then it will go to step 122. If it is [N] in step 406, then whether the film terminal end was detected or not is discriminated (step 407), and if it is [N], then it will go back to step 404, and if it is [Y], then rewinding starts (step 408), whether 0.1 frame was rewound or not is discriminated (step 409). If it is [N] in step 409, then it will go back to step 409, and if it is [Y], then a value 0.1 is subtracted from the value n of the first frame counter 9 (step 410), and whether the value n of the first frame counter 9 is smaller than a value −3 is discriminated (step 411). If it is [N] in step 411, then it will go back to 409 to continue the rewinding, and if it is [Y], then the rewinding stops (step 412). The data indicating that photographing all frames were completed and supply mode information are recorded in $E^2$ PROM 13a as frame information Nx (step 413, 414), and the return flag is reset (step 415). If the supply mode is discriminated as preparatory wind-up mode in step 402, then rewinding 1 starts (step 418), and whether 0.1 frame was rewound or not is discriminated (step 419), and if it is [N], then it will go to step 419, and if it is [Y], then a value 0.1 is subtracted from the value n of the first frame counter 9 (step 420), and whether the value n is smaller than a value 1 or not is discriminated (step 421). If it is [N] in step 421, then whether 1.0 frame was rewound or not is discriminated (step 422), and if it is [N], then it will go back to step 419 to continue the rewinding, and if it is [Y], then the rewinding stops (step 423) and the return flag is set (step 417), and then it will go to step 122. If it is [Y] in step 421, then whether 0.1 frame was rewound or not is discriminated (step 424), and if it is [N] in step 424, then it will go to step 424. If it is [Y] in step 424, then a value 0.1 is subtracted from the value n of the first frame counter 9 (step 425), and whether the value n is smaller than a value −3 or not is discriminated (step 426). If it is [N] in step 426, then it will go back to step 424 to continue the rewinding, and if it is [Y], then the rewind stops (step 427), and then it will go to step 413 to perform the operation in steps 414 and 415.

Figure 6:
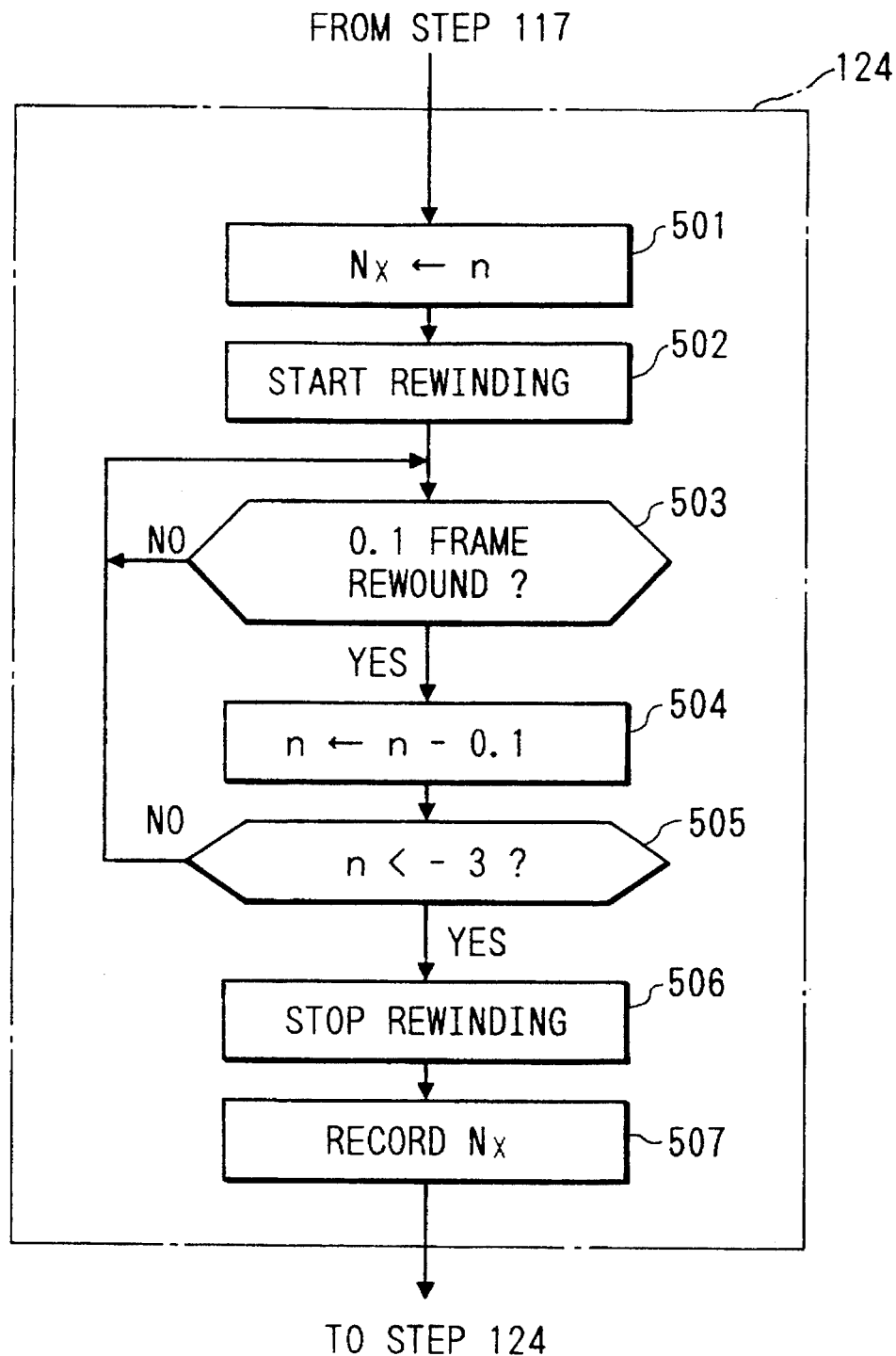

Midway rewind operation in the aforementioned step 124 will be described with reference to FIG. 6. The midway rewinding is performed to rewind the film in the cartridge and unload the cartridge before all frames are photographed.

At first, the value n of the first frame counter 9 is set to Nx of the frame information (step 501), then rewinding starts (step 502). Whether 0.1 frame was rewound or not is discriminated (step 503), and if it is [N], then it will go to step 503, and if it is [Y], then a value 0.1 is subtracted from the value n of the first frame counter 9 (step 504), and whether the value n of the first frame counter 9 is smaller than a value −3 or not is discriminated (step 505), and if it is [N], then it will go back to step 503 to continue the rewinding, and if it is [Y], then the rewinding stops because the film has been rewound up to its leader portion (step 506), and the frame information is recorded in E² PROM 13a (step 507), then it will go to step 124.

The second embodiment

The second embodiment of which operation similar to of the first embodiment will be omitted and of which operation different from the operation of the first embodiment will be mainly described.

Figure 8B:
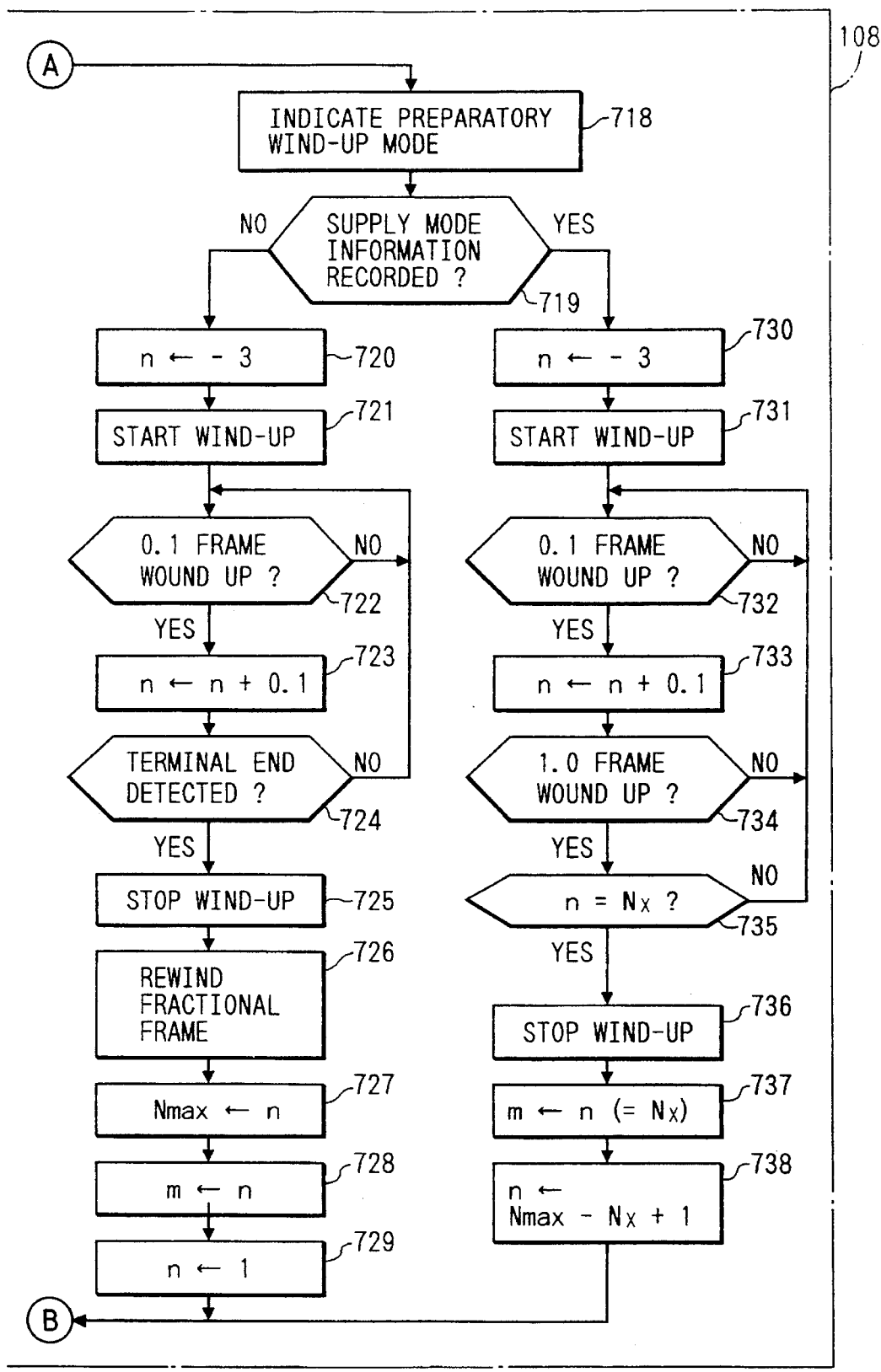

Preliminary wind-up operation (1) in step 108 corresponding to the second embodiment will be described with reference to the flow chart in FIG. 8, however, the operation in steps 702 to 717 is exactly the same in the steps 202 to 217 of the flow chart in FIG. 3, therefore no description will be provided.

If supply mode is discriminated as preparatory wind-up mode in step 701, preparatory wind-up mode is indicated (step 718), and whether supply mode information in E² PROM 13a was recorded or not is discriminated (step 719), and if there is no record, then the value n of the first frame counter 9 is set to a value −3 (step 720), and wind-up operation for the film starts (step 721), and whether 0.1 frame was wound up or not is discriminated (step 722). If it is [N] in step 722, then it will go back to step 722, and if it is [Y], then a value 0.1 is added to the value n (step 723). Whether the terminal end was detected or not is discriminated (step 724), if it is [N], then it will go to step 722, and if it is [Y], then the wind-up operation stopes (step 725). The fractional frame (equals to a portion of frames n less than the first decimal place) of the film supplied by the aforementioned film wind-up operation, is rewound (step 726). As a result, a frame corresponding to the last frame of the film is set to the position facing the lens. The value n of the first frame counter 9 is set to the numeric data $N_{Max}$ indicative of all frames of the film loaded (step 727), and the value n is set to the numeric data m which are stored in the second frame counter 9a (step 728). A value 1 is set to the numeric data n of the first frame counter 9 indicated to the outside in real time on the indicator 9 (step 729), and then it will go to step 115.

When supply mode information was recorded in step 719, namely, when a film is the midway use, film wind-up operation similar to that in aforementioned steps 720 to 723 is performed (steps 730 to 733), and whether 1.0 frame was wound up or not is discriminated (step 734), and if it is [N], then it will go back to step 732, and if it is [Y], then whether a value n equals to the value Nx of the frame information recorded in E² PROM 13a (step 735), and if it is [N], then it will go back to step 732, and if it is [Y], then the wind-up operation stops (step 736). The value n of the first frame counter 9, i.e., frame information Nx recorded in the aforementioned E² PROM 13a is set to the value m of the second frame counter 9a (step 737), and $N_{Max}-N_x+1$ is set to the value n of the first frame counter 9 (step 738), and then it will go to step 115. As a result, the number of frames is indicated in count-up system in preparatory wind-up mode as well.

Preliminary wind-up operation (2) in step 306 corresponding to the second embodiment will be described with reference to FIG. 11, however, the operation in steps 651 to 657 in FIG. 11 is exactly the same in the steps 601 to 607 in FIG. 7, therefore no description will be provided.

If supply mode newly set is preparatory wind-up mode in step 651, then film wind-up operation starts (step 658), and whether 0.1 frame was wound up or not is discriminated (step 659), and if it is [N], then it will go back to step 659, and if it is [Y], then a value 0.1 is added to the value n of the first frame counter (step 660), and whether the terminal end was detected or not is discriminated (step 661), and if it is [N], then it will go to step 659, and if it is [Y], then the wind-up operation stops (step 662), and the fractional frame is rewound to set a frame corresponding to the last frame of the film to the position facing the lens (step 663). The value n of the first frame counter 9 is set to the numeric data $N_{Max}$ indicative of all frames of the film loaded (step 664), and the value n is set to the value m of the second frame counter 9a (step 665). The value n of the first frame counter 9 is set to value 1 (step 666). As a result, when supply mode is set to preparatory wind-up mode, a value 1 is indicated on the indicator 8.

Figures 9, 9A:
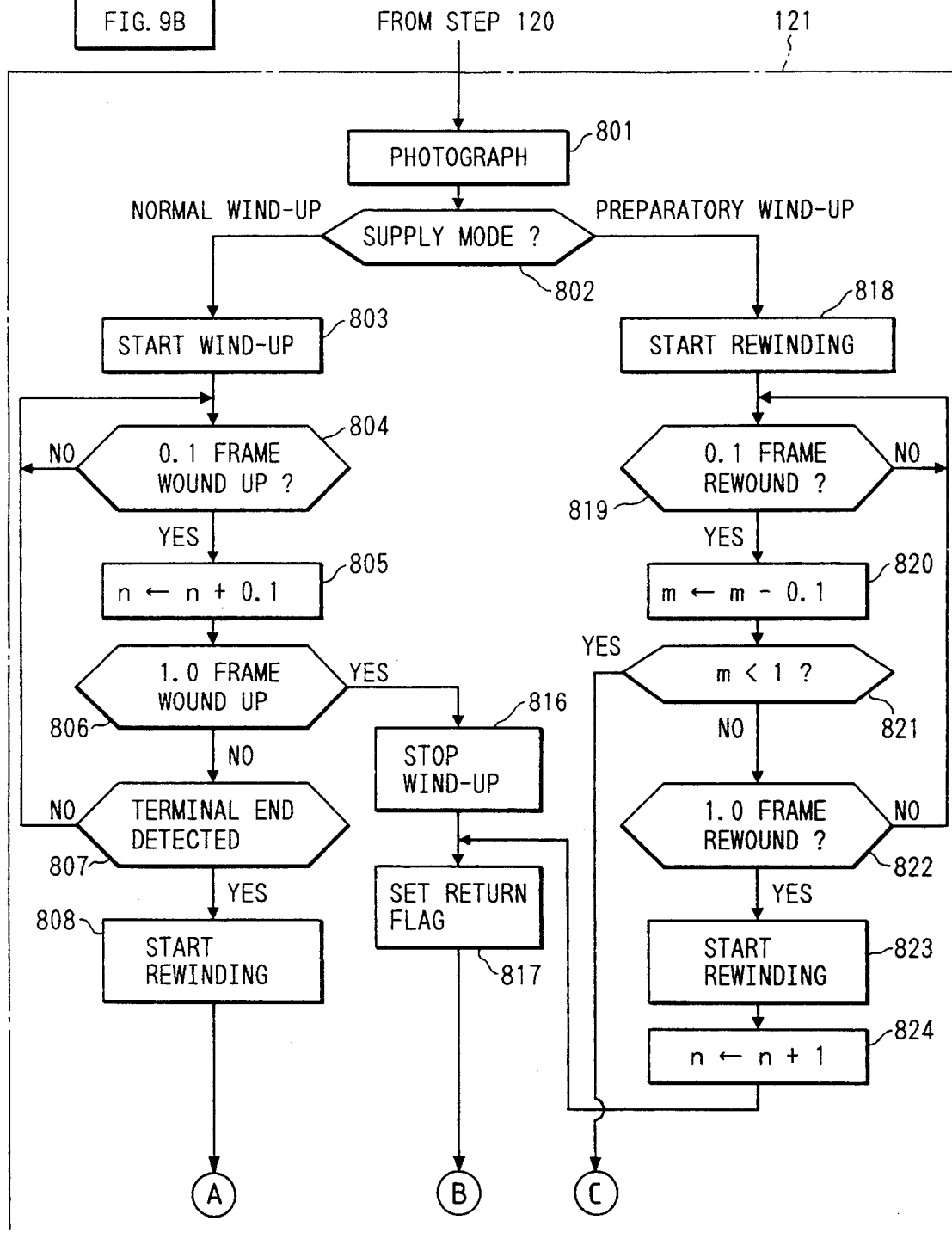
Figure 9B:
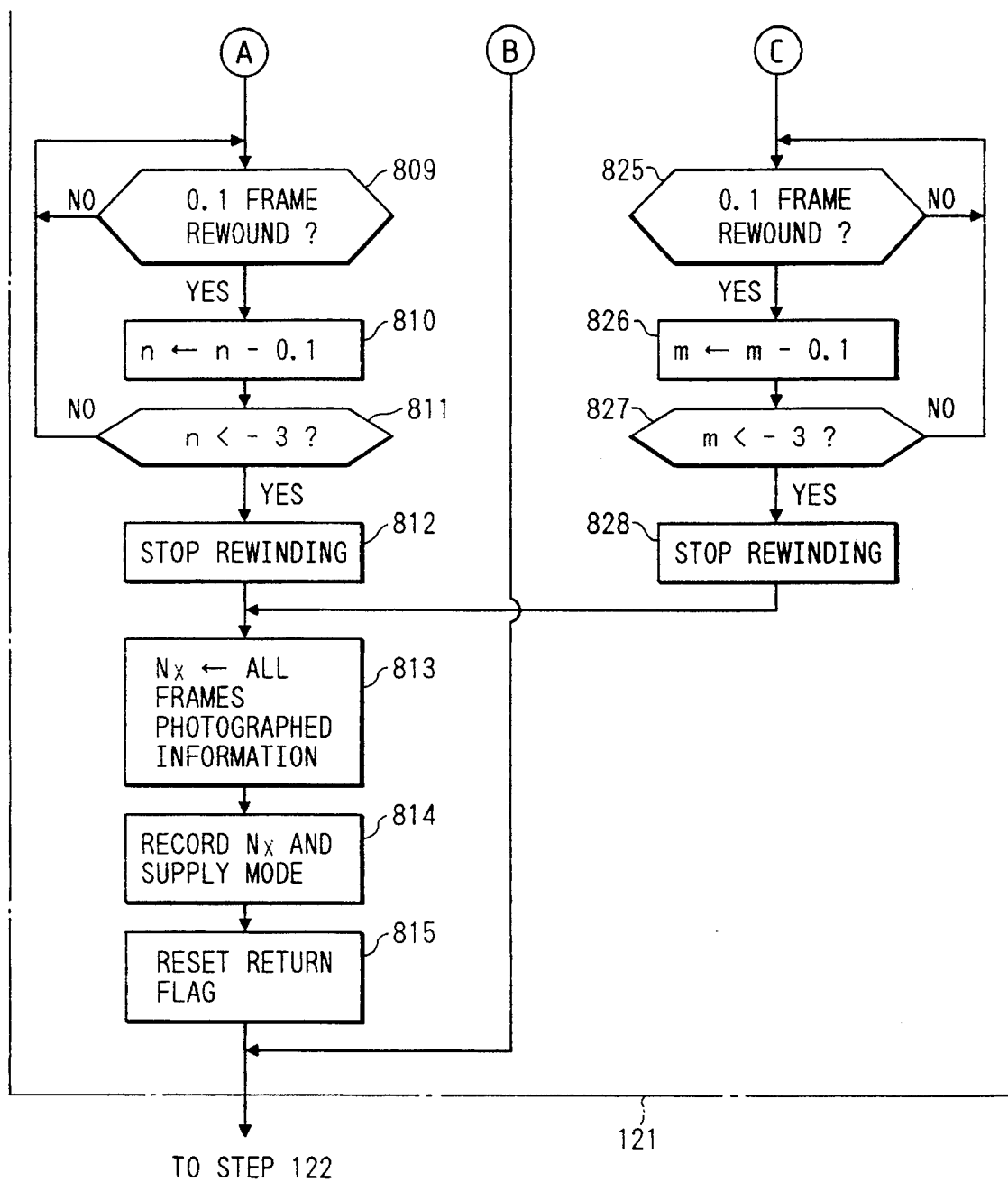

In the second embodiment, full-depressed operation in step 121 will be described with reference to FIG. 9, however, the operation in steps 801 to 815 is exactly the same in the steps 401 to 415 in FIG. 5, therefore no description will be provided.

If supply mode is discriminated as preparatory wind-up mode in step 802, then rewinding starts (step 818), and whether 0.1 frame was rewound or not is discriminated (step 819), and if it is [N], then it will go back to step 819, and if it is [Y], then a value 0.1 is subtracted from the value m of the second frame counter 9a (step 820). Whether the value m is smaller than a value 1 or not is discriminated (step 821), and if it is [N], then whether 1.0 frame was rewound or not is discriminate (step 822), and if it is [N] in step 822, then it will go back to step 819 to continue the rewinding, and if it is [Y] in step 822, then the rewinding stops (step 823), and a value 1 is added to the value n of the first frame counter 9 (step 824), and the return flag is set (step 817), and then it will go to step 122. If it is [Y] in step 821, then whether 0.1 frame was rewound or not is discriminated (step 825), and if it is [N], then it will go to step 825. If it is [Y], then a value 0.1 is subtracted from the value m of the second frame counter 9a (step 826), and whether the value m is smaller than a value −3 or not is discriminated (step 827), and if it is [N], then it will go back to step 825 to continue the rewinding, and if it is [Y], then the rewinding stops (step 828), and then it will go to step 813 to perform the operation in steps 814 and 815.

Figure 10:
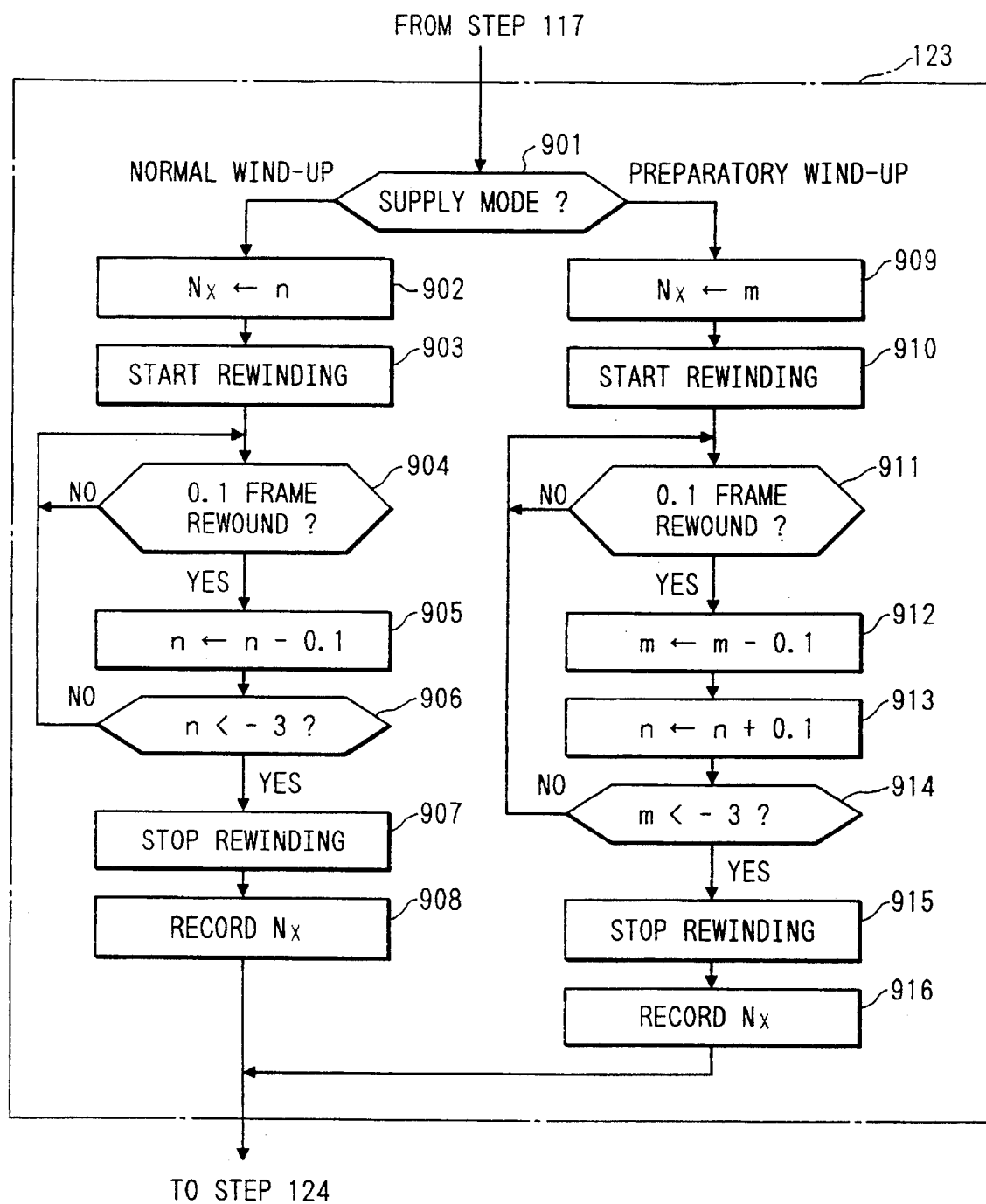

In the second embodiment, the midway rewinding in step 123 will be described with reference to FIG. 10, however, the operation in steps 902 to 908 is exactly the same in the steps 501 to 507 in FIG. 6, therefore no description will be provided.

If supply mode is discriminated as preparatory wind-up mode in step 901, then the value m of the second frame counter 9a is set to the value Nx of the frame information (step 909), and rewinding starts (step 910), and whether 0.1 frame was rewound or not is discriminated (step 911), and if it is [N], then it will go back to step 911, and if it is [Y], then a value 0.1 is subtracted from the value m of the second frame counter 9a (step 912), and a value 0.1 is added to the value n of the first frame counter 9 (step 913). Whether the aforementioned value m is smaller than a value −3 or not is discriminated (step 914), and if it is [N], then it will go back to step 911, and if it is [Y], then the rewinding stops (step 915), and the value Nx of the frame information is recorded in $E^2$ PROM 13a (step 916). As a result, when midway rewinding is performed in preparatory wind-up mode, the value Nx of the frame information counted in count-up system is recorded in $E^2$ PROM 13a.

Figure 2B:
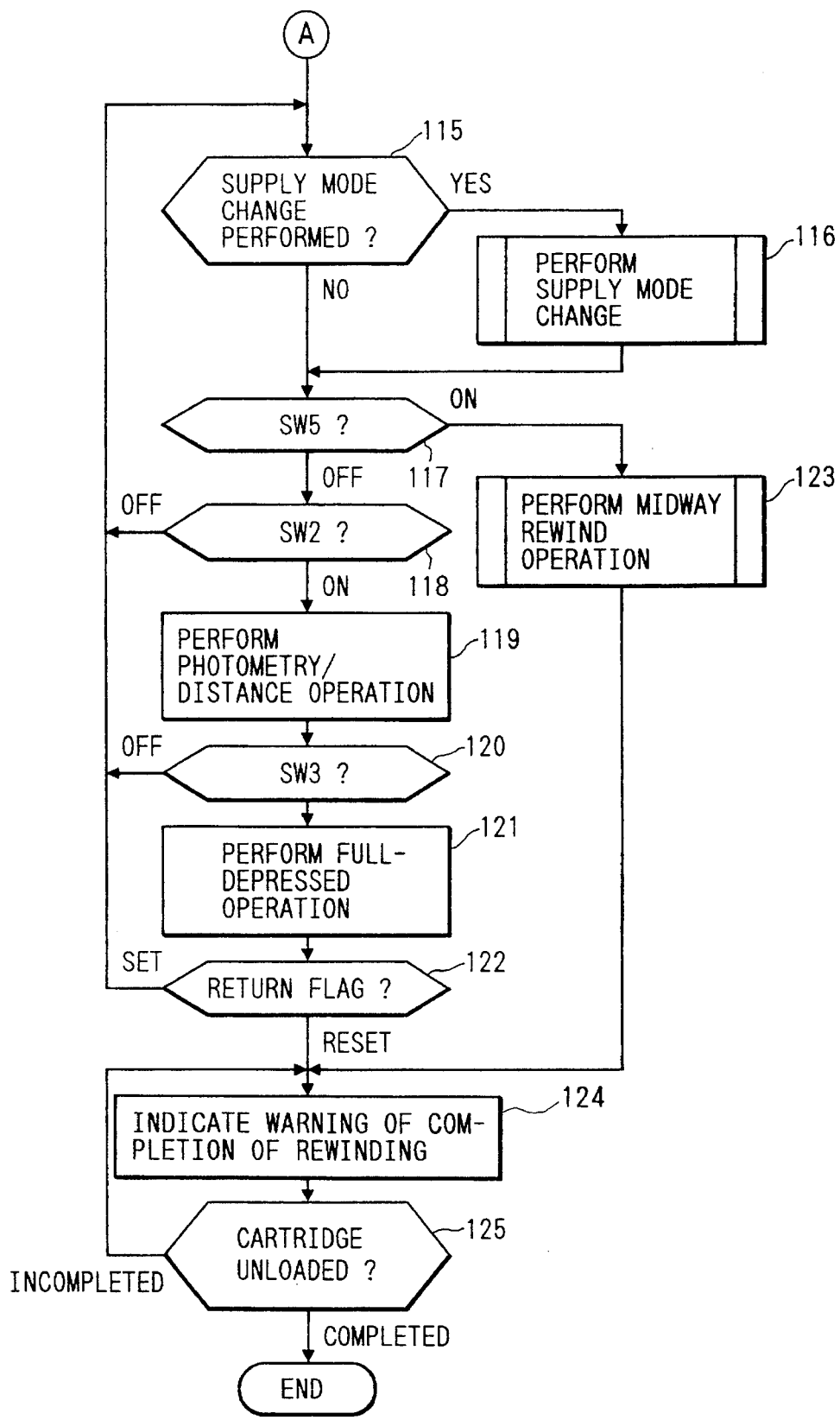

As illustrated in the flow chart of FIG. 2, the number of times the supply mode change can be repeated in step 115 through preliminary wind-up operation (1) in step 108 is predetermined, if and when the number is reached, supply mode change operation to be performed again is nullified as described in step 302. In that case, when such supply mode change is really needed, the film is rewound by operating the rewind switch SW5 in step 117 and the cartridge is once unloaded from the camera (steps 123 to 125) and is loaded into the camera again, and then if the procedure of the flow chart starts from step 101, it is possible to select arbitrary supply mode, since the supply mode change counter is reset in step 107.

In the embodiment described as above, $E^2$ PROM 13a was employed as a storage means recording supply mode information and frame information, however, it is not limited to this, for instance, a magnetic storage media may be provided at the leader portion of a film, and a magnetic head may be provided in contact with the magnetic storage media in a camera, such that the information mentioned as above can be recorded/reproduced into/from the magnetic storage media as described in U.S. Pat. No. 4,864,332. In this case, the timing to record/reproduce information is limited to when a film is rewound into the cartridge or taken out from the cartridge.

As described in Japanese Patent Laid-open Application No. 1-233431, a magnetic storage part may be provided on the side face of a cartridge, and an information record means for recording information into the magnetic storage part and an information detection means may be provided in the cartridge holder of a camera to obtain the same effect. In this case, the timing to record/reproduce information is limited to when a cartridge is loaded or unloaded into/from a camera.

In the embodiment, supply mode set can be changed until the first frame of a film is photographed after supply mode is once set, however, it may be configured to inhibit supply mode change after rhe supply mode is once set.

An improved example according to the invention will be described hereinafter. In the improved example, it is configured to detect a back lid being opened between the start of preliminary wind-up and the completion of rewinding a film after a cartridge was loaded, such that preparatory wind-up is performed for a cartridge to be loaded next. The improved example has the same circuits and drive configurations, however, there is a difference in operation for a circuit which is equivalent to the micro processor. The operation of the improved example will be described with reference to FIG. 12.

At first, a main switch SW1 is ON, and the main program in FIG. 2 is started by a calculation/control device 1 when a back lid switch SW6 is switched ON by closing the back lid of a camera. Whether a cartridge was loaded into the camera or not is detected by the state of a cartridge loaded switch SW7 ON or OFF (step 1101), and if a cartridge loaded is detected, then the state of a flag F1, whether it was set or reset, is discriminated (step 1102). If the flag F1 was reset, then normal windup mode is set in RAM as the initial supply mode (step 1103A), and if the flag F1 was set, then preparatory wind-up mode is set in RAM as the initial supply mode (step 1103B).

A mode selector switch SW4 is operated to discriminate whether supply mode change operation was performed or not (step 1104), and if it was not performed, then it will go to step 1106, if it was performed, then supply mode is changed (step 1105). Whether a half-depressed switch SW2 was depressed or not, i.e., whether supply mode was confirmed or not is discriminated (step 1106). Supply mode can be repeatedly reset, since the steps from 1104 to 1106 are repeated until this half-depressed switch SW2 is depressed to confirm supply mode. When the half-depressed switch SW2 is depressed in step 1106, a flag F2 is set (step 1107) to go to step 1108 for preliminary wind-up operation. This preliminary wind-up operation will be described later in detail.

Whether the state of a rewind switch SW5 is ON or OFF is discriminated after preliminary wind-up operation (step 1117), and if it is ON, then it will go to step 1124 through midway rewinding in step 1123 shown in the subroutine, and if it is OFF, then whether the state of the half-depressed switch SW2 is ON or OFF is discriminated (step 1118), and if it is OFF, then it will go back to 1117, and if it is ON, then photometry operation and range-finding operation are performed by photographing control system 3 (step 1119). Then, whether a full-depressed switch SW3 is ON or OFF is discriminated (1120), and if it is ON, then whether a return flag was set or reset through the full-depressed operation shown in the subroutine (step 1121) is discriminated (step 1122). This return flag will be described later in detail.

If the return flag was set, then it will go back to step 1117, and if it was reset, the warning of the completion of rewinding is indicated on the indicator 8 to advise an operator to unload the cartridge (step 1124). Then the flag F2 is reset (step 1124A), and whether unloading the cartridge was completed or not is discriminated by the state of the cartridge loaded switch SW7 ON or OFF (step 1125), and if unloading the cartridge was completed, then the operation ends, and if it is incomplete, then it will go back to step 1124.

Figure 13:
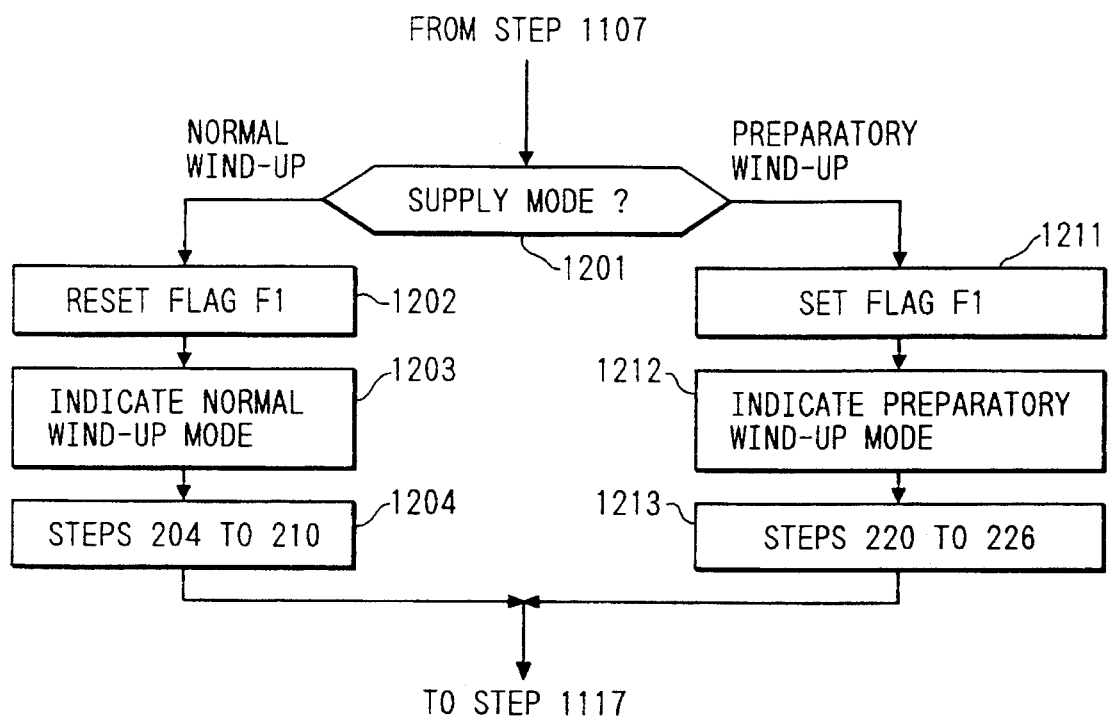
FIGS. 13, 14, and 15 are flow charts for subroutines in the improved example of the invention.

Preliminary wind-up operation in step 1108 will be described with reference to the flow chart in FIG. 13. This preliminary wind-up operation is performed for the preparation of photographing to wind up a film subsequently without exposure, and the film is fed by 4 frames in length without photographing in normal photographing mode and the film is fed up to the terminal end without photographing in preparatory wind-up mode.

Namely, supply mode confirmed by the half-depressed operation in step 1106 or 114 is disciminated (step 1201), and if it is normal wind-up mode, then the flag F1 is reset (step 1202), and normal supply mode is indicated on the indicator 8 (step 1203). Operation after this step is the same as in steps 204 to 210, so its description will be omitted. As a result, the first frame of the film is set to the position facing the lens.

On the other hand, in step 1201, supply mode is preparatory wind-up mode, the flag F1 is set- (step 1211), and preparatory wind-up mode is indicated (step 1212). Operation after this step is the same as in steps 220 to 226, so its description will be omitted. As a result, a frame corresponding to the last frame of the film is set to the position facing the lens.

Figure 14:
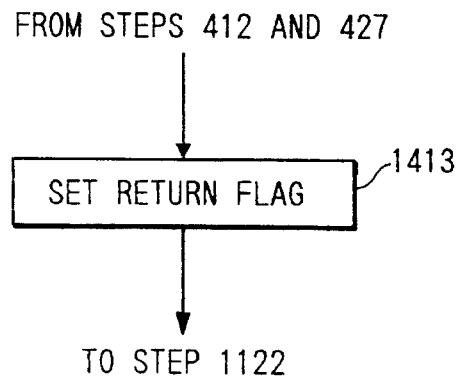

The aforementioned full-depressed operation in step 1121 will be described. In the full-depressed operation, operations associated with photographing, frame feeding operation, and rewinding are performed, however, these operations are the same as in FIG. 4 other than step 1413 in FIG. 14, so their detailed description will be omitted. Operation in response to each supply mode is performed after photographing by the full-depressed operation. In normal wind-up mode, a film is wound up by one frame after photographing, and the all film is rewound when the terminal end is detected. A return flag is set in step 1413 after the completion of rewinding. In preparatory wind-up mode, a film is rewound by one frame after photographing, and the film is completely rewound when the leader portion comes out. The return flag is reset in step 1413 after the completion of rewinding.

Figure 15:
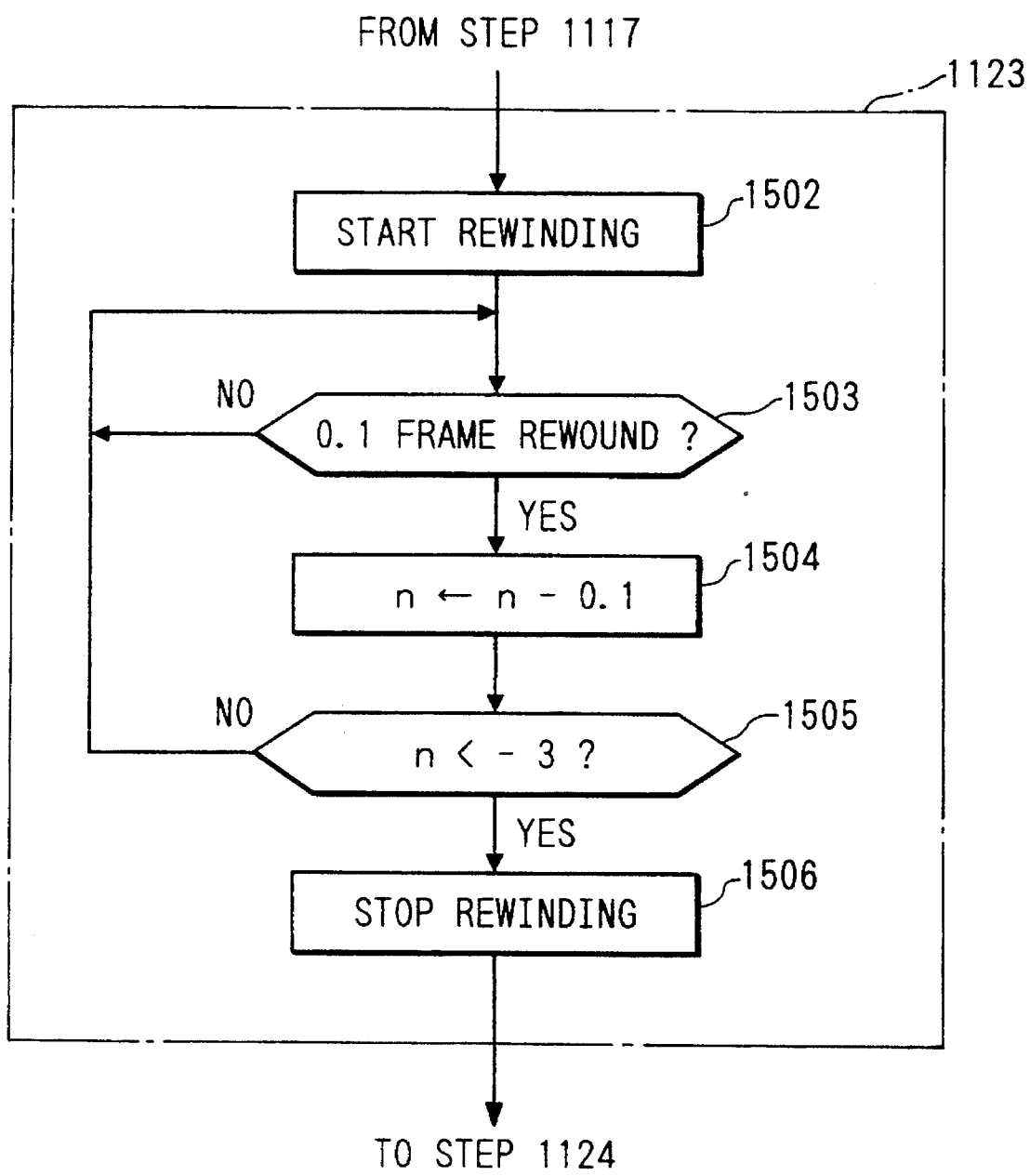

The aforementioned midway rewinding in step 1123 will be described with reference to FIG. 15. This midway rewinding is performed in order to rewind a film into a cartridge and unload the cartridge before photographing for all frames is completed. Operation in FIG. 15 is the operation from which steps 501 to 507 are excluded, so the concrete description of the operation will be omitted.

Procedures to executed after a back lid is opened, will be described with reference to the flow chart in FIG. 16. When a back lid switch SW6 is OFF, namely, this program is activated in interruption when the back lid is opened. At first, whether the state of the aforementioned flag F2 is discriminated (step 1601). The flag F2 is set in step 1107 immediately before step 1108 (preliminary wind-up operation) in FIG. 12 as described above, and it is reset in step 1124A when the return flag being reset is discriminated in step 1122, i.e., when rewinding is completed.

If the flag F2 is in reset state, then wait until the back lid is closed (step 1602), and go to the aforementioned step 1101 (FIG. 12) when closed. On the other hand, if the flag F2 is in set state, then the flag F1 is set (step 1603), and the warning of the back lid opened is indicated on the indicator 8 through an indicator control circuit 7 (step 1604) and continued until the back lid is closed in step 1605. The warning stops when the back lid is closed, and supply mode is discriminated (step 1606).

If supply mode i s preparatory wind-up mode, rewinding for the film starts (step 1607), and whether 0.1 frame was rewound or not is discriminated (step 1608), and if it is [N], then it will go back to 1608, and if it is [Y], then a value 0.1 is subtracted from the aforementioned value n (step 1609), and whether the value n is smaller than a value −3 or not is discriminated (step 1610), and if it is [N], then it will go back to 1608, and if it is [Y], then the rewinding stops (.step 1611), and it will go to step 1124 (FIG. 2).

Figure 12B:
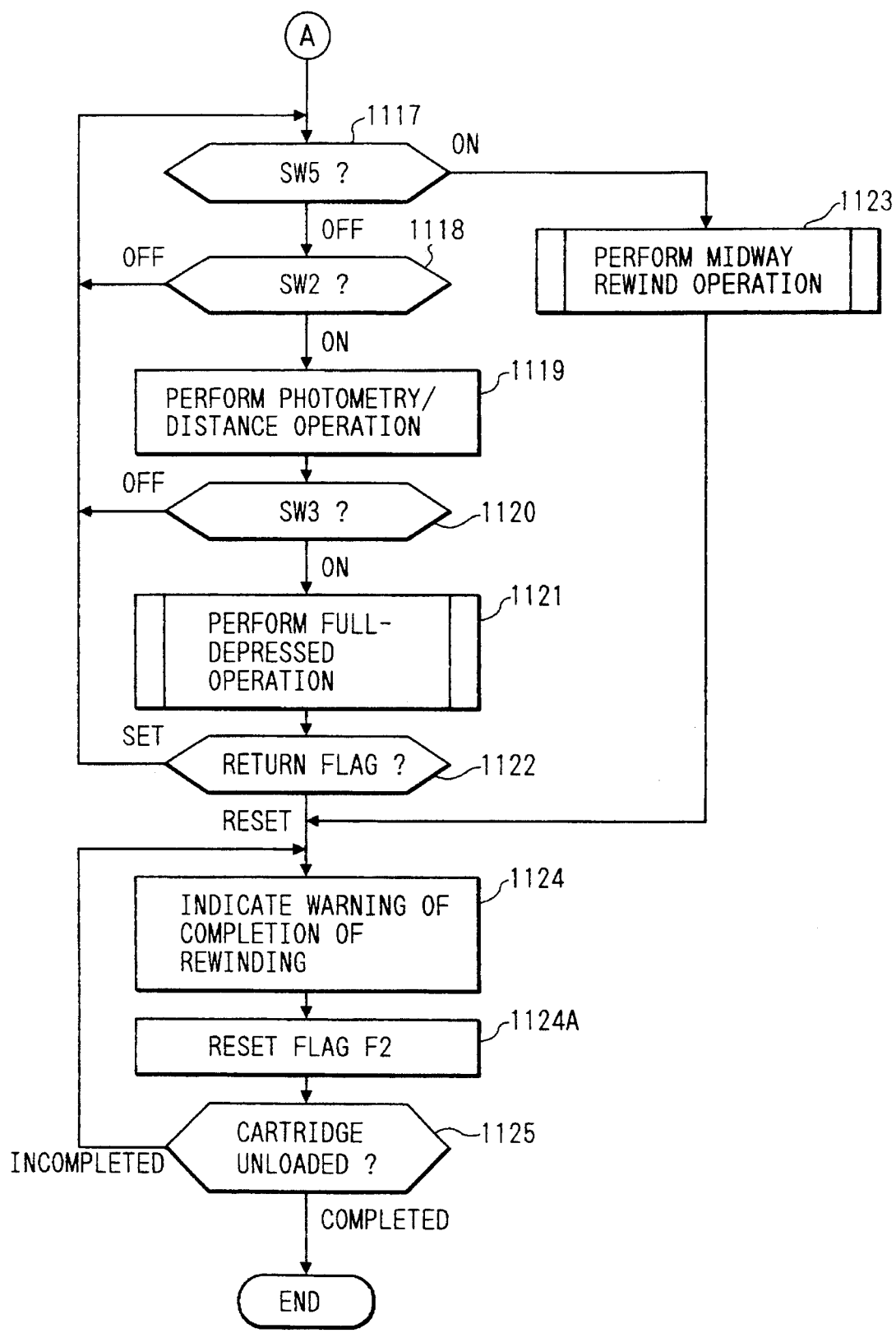

On the other hand, when it is discriminated that supply mode is normal wind-up mode in step 1606, a value −2 is set to the value n (step 1612), and wind-up operation starts (step 1613), and whether 0.1 frame was wound up or not is discriminated (step 1614). If it is [N], then it will go back to step 1614, and if it is [Y], then a value 0.1 is added to the value n (step 1615), and whether the film terminal end was detected or not is discriminated (step 1616). If it is [Y], then it will go to step 408. However, it will go to step 1413 in FIG. 14 after step 412. If it is [N] in step 1616, then whether the value in is a value 1 or not is discriminated (step 1617), and if it is [N] in step 1617, then it will go back to step 1614, and if it is [Y], then wind-up operation stops (step 1618) to go to step 1117 (FIG. 12).

Figure 16B:
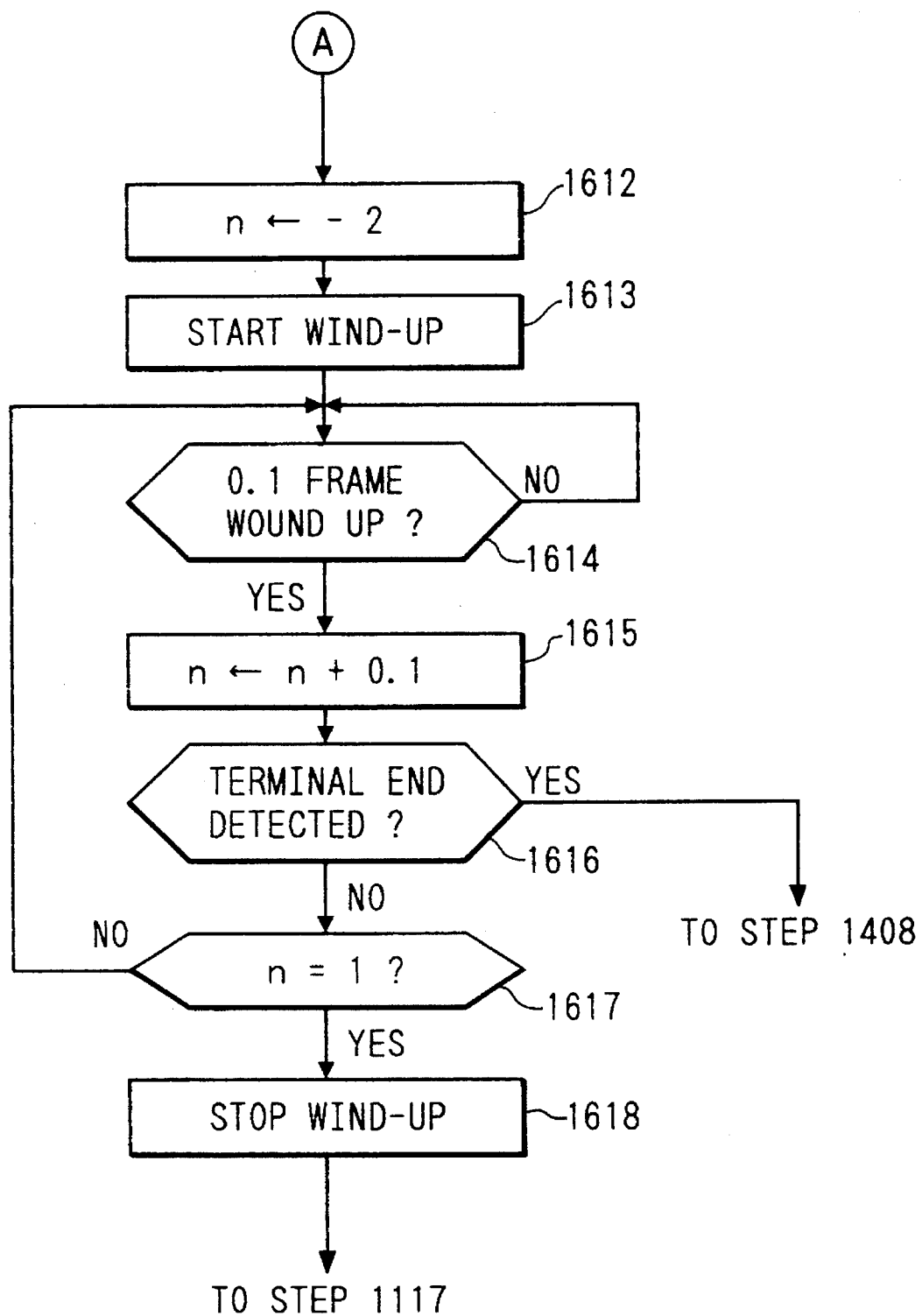

According to the aforementioned procedures in FIG. 16, when a back lid is opened by mistake between preliminary wind-up and rewinding, i.e. , before photographing all frames is completed, a flag F1 is set and the warning is indicated. As a result of the flag F1 set, preparatory wind-up mode is automatically selected as the initial supply mode when a film is loaded next time. Therefore, from the next time, the film photographed is not exposed even if a back lid is opened by mistake before the completion of photographing for all frames.

The back lid is opened before the photographing of all frames is completed as described hereinbefore, and the back lid is closed after that, in that case, operation is different depending on the aforementioned supply mode. Namely, if it is preparatory mode, then all film is rewound completely, since all film not photographed is exposed with the aforementioned back lid opened and photographing can not be continued with the film.

On the other hand, if supply mode is normal wind-up mode, photographing can be continued, even if the back lid was once opened, since a film not photographed is still in the cartridge. However, the portion of the film drawn out from the cartridge is exposed, so photographing with that portion is impossible, therefore, operation for winding up the film by predetermined frames after the back lid was opened is needed. In this embodiment, a film is wound up by 3 frames in length, the amount is smaller than 4 frames in length which are performed without photographing after a film is loaded as described hereinbefore. Namely, in this case, the amount of wind-up can be reduced, since there is no need to consider the leader portion of a film to be wound up. Consequently, the consumption of a film is reduced and the number of frames to be photographed are increased in comparison with the case of wind-up by 4 frames in length similar to the feeding procedure without photographing. However, the amount of a film wound up may not be limited to 3 frames in length.

In this improved example, when either supply mode is once selected by operating a mode selector switch SW4, a flag F1 is either set or reset in response to the mode selected, the state of the flag F1 is maintained until the switch SW4 is operated. Therefore, if preferred mode is selected, the mode is set as the initial supply mode without selecting operation after that as long as a back lid is not opened before the photographing of all frames is completed.

We claim:

1. A camera capable of loading a film unit having a film and a cartridge comprising:

an exposure mechanism;

a supply mechanism for supplying the film, said supply mechanism having a first mode for winding up the film from the cartridge of said film unit loaded into said camera in response to the operation of said exposure mechanism and a second mode for rewinding the film to the cartridge of said film unit loaded into said camera in response to the operation of said exposure mechanism;

a selector part for selecting one mode from either said first mode or said second mode, wherein said supply mechanism supplies the film based on a mode selected by said selector part; and an inhibit mechanism for inhibiting switching said mode selected by said selector part into the other mode only after an operation by said exposure mechanism.

2. A camera capable of loading a film unit having a film, a cartridge, and a recording medium comprising:

an exposure mechanism;

a supply mechanism for supplying the film, said supply mechanism having a first mode for winding up the film from the cartridge of said film unit loaded into said camera in response to the operation of said exposure mechanism and a second mode for rewinding the film to the cartridge of said film unit loaded into said camera in response to the operation of said exposure mechanism;

a selector part for selecting one mode from either said first mode or said second mode, wherein said supply mechanism supplies the film in accordance with a mode selected by said selector part; and a recorder for storing mode information related to the mode selected by said selector part into said recording medium.

3. The camera of claim 2, further including a reproducer for reading mode information stored into said recording medium, wherein said supply mechanism supplies said film in accordance with mode information read by said reproducer.

4. The camera of claim 2, further including a counter for counting frames photographed for said film unit loaded, wherein said recorder stores frame information related to frames counted by said counter into said recording medium.

5. The camera of claim 4, further including a reproducer for reading frame information stored into said recording medium, wherein said supply mechanism supplies the film in accordance with frame information read by said reproducer.

6. A camera capable of loading a film unit having a film and a cartridge comprising:

an exposure mechanism;

a supply mechanism for supplying the film, said supply mechanism having a first mode for winding up the film from the cartridge of the film unit loaded into said camera in response to the operation of said exposure mechanism and a second mode for rewinding the film to the cartridge of the film unit loaded into said camera in response to the operation of said exposure mechanism;

a selector part for selecting one mode from either said first mode or said second mode, wherein said supply mechanism supplies the film based on a mode selected by said selector part; and an inhibit mechanism for inhibiting repeating mode change more than predetermined times.

7. A camera capable of loading a film unit having a film and a cartridge comprising:

an exposure mechanism;

a supply mechanism for supplying the film, wherein said supply mechanism performs a preliminary wind-up operation winding up a film from a cartridge prior to film exposure by said exposure mechanism and has a first mode for winding up the film from the cartridge of said film unit loaded into said camera in response to the operation of said exposure mechanism and a second mode for rewinding the film to the cartridge of said film unit loaded into said camera in response to the operation of said exposure mechanism;

an operation mechanism operated to unload the film unit loaded into said camera from said camera;

a detector for detecting the operation of said operation mechanism and allowing detection signals to output; and a controller for allowing said supply mechanism to supply a film in accordance with said second mode for a film unit to be loaded into said camera next time when said detection signals are output during the period of time from the start of said preliminary wind-up to the completion of rewinding a film.

8. A camera capable of loading a film unit having a film and a cartridge comprising:

an exposure mechanism;

a supply mechanism for supplying the film, wherein said supply mechanism performs a preliminary wind-up operation winding up a film from a cartridge prior to film exposure by said exposure mechanism and has a first mode for winding up the film from the cartridge of said film unit loaded into said camera in response to the operation of said exposure mechanism and a second mode for rewinding the film to the cartridge of said film unit loaded into said camera in response to the operation of said exposure mechanism;

an operation mechanism operated to load a film unit into said camera and unload a film unit loaded into said camera from said camera;

a mechanism for detecting the operation of said operation mechanism and allowing detection signals to output; and a controller for allowing said supply mechanism to supply a film in accordance with said second mode for a film unit to be loaded into said camera next time when said detection signals are output during the period of time from the start of said preliminary wind-up operation to the completion of rewinding a film into the cartridge of said film unit.

9. The camera of claim 8, wherein said controller allows said supply mechanism to supply the film by a predetermined amount in response to the operation of said operation mechanism loading said film unit, after said detected signals are output during the period of time from the start of said preliminary wind-up to the completion of rewinding the film into the cartridge.

10. The camera of claim 9, wherein said controller does not allow the supply mechanism to supply the film by said predetermined amount in said second mode.

11. A camera capable of loading a film unit having a film and a cartridge comprising:

an exposure mechanism;

a supply mechanism for supplying the film, wherein said supply mechanism performs a preliminary wind-up operation winding up a film from a cartridge prior to film exposure by said exposure mechanism and has a first mode for winding up the film from the cartridge of said film unit loaded into said camera in response to the operation of said exposure mechanism and a second mode for rewinding the film to the cartridge of said film unit loaded into said camera in response to the operation of said exposure mechanism;

a selector part for selecting one mode from either said first mode or said second mode, wherein said supply mechanism supplies the film based on a mode selected by said selector part;

a recording medium; and a recorder for storing information related to the mode selected by said selector part into said recording medium.

12. A camera capable of loading a film unit having a film, a cartridge, and a recording medium, comprising:

an exposure mechanism;

a supply mechanism for supplying film, said supply mechanism winding up the film from the cartridge of said film unit loaded into said camera in response to the operation of said exposure mechanism; and a recorder which stores into said recording medium mode information used for said camera and indicating that the film was wound up from the cartridge in response to an operation of said exposure mechanism.

13. A camera capable of loading a film unit having a film, a cartridge, and recording medium, comprising:

an exposure mechanism;

a supply mechanism for supplying film, said supply mechanism rewinding into the cartridge film wound from the cartridge of said film unit loaded into said camera, in response to the operation of said exposure mechanism; and a recorder which stores into said recording medium mode information used for said camera and indicating that the film was rewound to the cartridge in response to an operation of said exposure mechanism.

14. A camera capable of loading a film unit having a film and a cartridge comprising:

an exposure mechanism;

a supply mechanism for supplying film, wherein said supply mechanism performs a preliminary wind-up operation winding up a film from a cartridge prior to film exposure by said exposure mechanism and has a first mode for winding up the film from the cartridge of said film unit loaded into said camera in response to the operation of said exposure mechanism and a second mode for rewinding the film to the cartridge of said film unit loaded into said camera in response to the operation of said exposure mechanism;

a lid operated to unload the film unit loaded into said camera from said camera;

a detector for detecting the operation of said lid; and a controller for setting said supply mechanism to supply a film in accordance with said second mode for a film unit to be loaded into said camera next time when said detector has detected the operation of said lid during the period of time from the start of said preliminary wind-up operation to the completion of rewinding a film.

15. A camera capable of loading a film unit having a film and a cartridge comprising:

an exposure mechanism;

a supply mechanism for supplying the film, wherein said supply mechanism performs a preliminary wind-up operation winding up a film from a cartridge prior to film exposure by said exposure mechanism and has a first mode for winding up the film from the cartridge of said film unit loaded into said camera in response to the operation of said exposure mechanism and a second mode for rewinding the film to the cartridge of said film unit loaded into said camera in response to the operation of said exposure mechanism;

a lid operated to load a film unit into said camera and unload a film unit loaded into said camera from said camera;

a detector for detecting the operation of said lid; and a controller for setting said supply mechanism to supply a film in accordance with said second mode for a film unit to be loaded into said camera next time when said detector has detected the operation of said lid during the period of time from the start of said preliminary wind-up operation to the completion of rewinding a film into the cartridge of said film unit.

16. The camera of claim 15, wherein said controller sets said supply mechanism to wind-up the film by a predetermined amount in response to the operation of said lid loading said film unit, after said detector has detected the operation of said lid during the period of time from the start of said preliminary wind-up operation to the completion of rewinding the film into the cartridge in said first mode.

17. The camera of claim 16, wherein said controller does not set said supply mechanism to wind-up the film by said predetermined amount in said second mode.

18. A camera capable of loading a film unit having a cartridge and a film contained in the cartridge and including a plurality of frames to be exposed comprising:

an exposure mechanism for exposing each frame of the film at an exposure position;

a transport mechanism for winding-up the film from the cartridge to bring an unexposed frame to the exposure position in response to the operation of the exposure mechanism and for rewinding the film to the cartridge after all the frames are exposed;

a lid which is opened to unload the film unit from the camera and closed to load the film unit into the camera;

a first detector for detecting that the lid is opened and then closed after the completion of the rewinding;

a second detector for detecting that the lid is opened and then closed even though unexposed frames remain between the cartridge and the exposure position and in the cartridge; and a controller for setting the transport mechanism to wind-up the film from the cartridge by a first amount, sufficient to bring an unexposed frame in the cartridge to the exposure position, in response to the detecting of the first detector, and to wind-up the film from the cartridge by a second amount, sufficient to bring an unexposed frame in the cartridge to the exposure position, in response to the detecting of the second detector, wherein the second amount is smaller than the first amount.

19. A camera capable of loading a film unit having a cartridge and a film contained in the cartridge and including a plurality of frames to be exposed comprising:

an exposure mechanism for exposing each frame of the film at an exposure position;

a transport mechanism for winding-up the film from the cartridge and rewinding the film into the cartridge;

a lid opened to unload the film unit from the camera and closed to load the film unit into the camera;

a first detector for detecting that the lid is opened and then closed after all the frames are rewound into the cartridge and before the film unit is unloaded;

a second detector for detecting that the lid is opened and then closed even though frames remain out of the cartridge;

a third detector for detecting that the lid is opened and then closed after all the frames are rewound into the cartridge and another film unit is loaded into the camera; and a controller for setting the transport mechanism to wind-up all the frames from the cartridge in response to the detecting of the third detector, to rewind a frame exposed by the exposure mechanism into the cartridge for bringing an unexposed frame to the exposure position in response to the operation of the exposure mechanism, to rewind all the frames into the cartridge in response to the detecting of the second detector, and to inhibit winding-up the film from the cartridge in response to the detecting of the first detector.

20. The camera according to claim 19, wherein the controller sets the transport mechanism to inhibit rewinding the film into the cartridge in response to the detecting of the first detector.

21. A camera capable of loading a film unit having a cartridge and a film contained in the cartridge and including a plurality of frames to be exposed, and a recording medium recording first information indicating whether the film in the cartridge was wound-up or rewound by a frame in response to an exposure and second information relating to an unexposed frame to be first exposed after reloading of the film unit, comprising:

an exposure mechanism for exposing each frame of the film at an exposure position;

a transport mechanism for winding-up the film from the cartridge and rewinding the film into the cartridge;

a reproducer for reading the first and second information from the recording medium; and a controller for controlling the transport mechanism in accordance with the first and second information read by the reproducer, wherein if the first information read by the reproducer indicates that the film was wound-up in response to an exposure, the controller sets the transport mechanism to transport the film from the cartridge for bringing the unexposed frame corresponding to the second information read by the reproducer to the exposure position after the film unit is reloaded into the camera, and to wind-up the film by a frame in response to the operation of the exposure mechanism, if the first information read by the reproducer indicates that the film was rewound in response to an exposure, the controller sets the transport mechanism to transport the film from the cartridge for bringing the unexposed frame corresponding to the second information read by the reproducer to the exposure position after the film unit is reloaded into the camera, and to rewind the film by a frame in response to the operation of the exposure mechanism.

22. The camera according to claim 21, wherein the controller sets the transport means to wind-up the film from the cartridge for bringing the unexposed frame corresponding to the second information read by the reproducer to the exposure position after the film unit is reloaded into the camera regardless of the first information.

23. A camera capable of loading a film unit having a cartridge and a film contained in the cartridge and including a plurality of frames to be exposed, and a recording medium recording first information indicating whether the film in the cartridge was wound-up or rewound by a frame in response to an exposure and second information indicating which unexposed frame is to be first exposed after the film unit is reloaded into the camera, comprising:

an exposure mechanism for exposing each frame of the film at an exposure position;

a transport mechanism for winding-up the film from the cartridge;

a reproducer for reading the first and second information from the recording medium; and a controller for controlling the transport mechanism in accordance with the first and second information read by the reproducer, wherein if the first information read by the reproducer indicates that the film was wound up in response to an exposure, the controller sets the transport mechanism to wind up the film from the cartridge for bringing the unexposed frame indicated by the second information read by the reproducer to the exposure position after the film unit is reloaded into the camera, and to wind-up the film by a frame in response to the operation of the exposure mechanism.

24. A camera capable of loading a film unit having a cartridge and a film contained in the cartridge and including a plurality of frames to be exposed, and a recording medium recording first information indicating whether the film was wound-up or rewound by a frame in response to an exposure, and second information indicating which unexposed frame is to be first exposed after the film unit is reloaded into the camera, comprising:

an exposure mechanism for exposing each frame of the film at an exposure position;

a transport mechanism for winding-up the film from the cartridge and rewinding the film into the cartridge;

a reproducer for reading the first and second information from the recording medium;

a controller for controlling the transport mechanism in accordance with the first and second information read by the reproducer, wherein if the first information read by the reproducer indicates that the film is rewound in response to an exposure, the controller sets the transport mechanism to-transport the film from the cartridge for bringing the unexposed frame indicated by the second information read by the reproducer to the exposure position after the film unit is reloaded into the camera, and to rewind the film by a frame in response to the operation of the exposure mechanism.

25. The camera according to claim 24, wherein if the first information read by the reproducer indicates that the film is rewound in response to an exposure, the controller sets the transport mechanism to wind-up the film from the cartridge for bringing the unexposed frame indicated by the second information read by the reproducer to the exposure position after the film unit is reloaded into the camera.

26. A camera capable of loading a film unit having a cartridge and a film contained in the cartridge and including a plurality of frames to be exposed, and a recording medium recording information relating to an unexposed frame to be first exposed, comprising:

an exposure mechanism for exposing each frame of the film at an exposure position;

a transport mechanism for winding-up the film from the cartridge and rewinding the film into the cartridge;

a first transport signal part for generating a first transport signal;

a second transport signal part for generating a second transport signal;

a reproducer for reading the information from the recording medium; and a controller for controlling the transport mechanism in response to the first and second transport signals, wherein the controller sets the transport mechanism to rewind all the frames of the film into the cartridge in response to the first transport signal, and to transport the film in response to the second transport signal for bringing the frame corresponding to the information read by the reproducer to the exposure position, and wherein the second transport signal part generates the second transport signal even though the film unit is not unloaded from the camera after rewinding of all the frames, whereby the controller sets the transport mechanism to transport the film in response to the second transport signal even though the film unit is not unloaded from the camera after rewinding of all the frames.

27. The camera according to claim 26, further including a lid which is opened to unload the film unit from the camera and closed to load the film unit into the camera, wherein the second transport signal part generates the second transport signal when the lid is closed.

28. A camera capable of loading a film unit having a cartridge and a film contained in the cartridge and including a plurality of frames to be exposed, and a recording medium disposed on the cartridge and recording information indicating whether a frame to be exposed remains in the cartridge, comprising:

an exposure mechanism for exposing each frame of the film at an exposure position;

a transport mechanism for winding-up the film from the cartridge and rewinding the film into the cartridge;

a first transport signal part for generating a first transport signal to rewind all the frames of the film into the cartridge;

a second transport signal part for generating a second transport signal, after the rewinding of all the frames, to bring a frame to be exposed to the exposure position;

a recorder for storing the information into the recording medium;

a reproducer for reading the information from the recording medium without movement of the recording medium; and a controller for controlling the transport mechanism and reproducer, wherein the controller sets the transport mechanism to rewind all the frames of the film into the cartridge in response to the first transport signal, the controller sets the reproducer to read the information in response to the second transport signal, the controller sets the transport mechanism to transport the film for bringing the frame to be exposed to the exposure position if the information indicates that a frame to be exposed remains in the cartridge, the controller sets the transport mechanism not to transport the film in response to the second transport signal if the information indicates that no frame to be exposed remains in the cartridge, and the reproducer reads the information in response to the second transport signal even though the film unit in which all the frames have been rewound is not unloaded from the camera.

29. The camera according to claim 28, further including a lid which is opened to unload the film means from the camera and closed to load the film unit into the camera, wherein the second transport signal part generates the second transport signal when the lid means is closed.

30. A camera capable of loading a film unit having a film and a cartridge containing the film comprising:

an exposure mechanism;

a transport mechanism for transporting film, the transport mechanism having a first mode for winding up the film from the cartridge in response to the operation of the exposure mechanism and a second mode for rewinding the film into the cartridge in response to the operation of the exposure mechanism;

a selector part for selecting one mode from either the first mode or the second mode, wherein the transport mechanism transports the film in accordance with a mode selected by the selector part;

a first inhibit mechanism for inhibiting change of the mode selected by the selector part into the other mode after the operation of the exposure mechanism; and a second inhibit mechanism for inhibiting changing the mode more than predetermined times when the film unit is loaded into the camera.

31. A camera capable of loading a film unit having a cartridge and a film contained in the cartridge and including a plurality of frames to be exposed, and a recording medium capable of storing information, including information indicating one mode of either first and second transporting modes, comprising:

a transport mechanism for winding-up the film from the cartridge and rewinding the film into the cartridge;

a reproducer for reading the information from the recording medium;

a selector part for selecting one mode from either the first transporting mode or the second transporting mode;

an exposure mechanism for exposing each frame of the film at an exposure position;

a controller for controlling the transport mechanism in accordance with the mode indicated by the information read by the reproducer or the mode selected by the selector part, wherein the controller sets the transport mechanism to wind-up the film by a frame in response to the operation of the exposure mechanism if the information read by the reproducer indicates the first transporting mode, to rewind the film by a frame in response to the operation of the exposure mechanism if the information read by the reproducer indicates the second transporting mode, and to wind-up or rewind the film by a frame in response to the operation of the exposure mechanism in accordance with the mode selected by the selector part if the information read by the reproducer indicates neither the first transporting mode nor the second transporting mode.

32. A camera capable of loading a film unit having a cartridge and a film contained in the cartridge and including a plurality of frames to be exposed, and a recording medium capable of storing information, including information indicating one mode of either first and second transporting modes, comprising:

a transport mechanism for winding-up the film from the cartridge and rewinding the film into the cartridge;

a reproducer for reading the information from the recording medium;

a selector part for selecting one mode from either the first transporting mode or the second transporting mode;

an exposure mechanism for exposing each frame of the film at an exposure position;

a controller for controlling the transport mechanism in accordance with the mode indicated by the information read by the reproducer or the mode selected by the selector part, wherein the controller sets the transport mechanism to wind-up the film by a frame in response to the operation of the exposure mechanism if the information read by the reproducer indicates the first transporting mode, to rewind the film by a frame in response to the operation of the exposure mechanism if the information read by the reproducer indicates the second transporting mode, and to wind up or rewind the film by a frame in response to the operation of the exposure mechanism in accordance with a mode selected by the selector part while a previous film unit was loaded, if the information read by the reproducer indicates neither the first transporting mode nor the second transporting mode.

33. The camera according to claim 11, wherein the supply mechanism supplies the film in accordance with the information stored in the recording medium when another film means is loaded into the camera.

34. A camera capable of loading a film unit having a film with a plurality of frames, a cartridge in which said film is inserted and an information recording part, the camera including a film drive mechanism capable of performing a preliminary wind-up operation by which an unexposed frame to be photographed is at first extracted from said cartridge after said film unit is loaded in said camera to bring it to a photographing position, and a rewind operation by which said film extracted from said cartridge is rewound within said cartridge in order to take out said film unit from said camera, a rewind instructing part for producing an instruction signal for starting said rewind operation, a controller which allows said film drive mechanism to perform said preliminary wind-up operation after said film unit is loaded and allows said rewind operation by said film drive mechanism to be started in response to said rewind instruction signal, the improvement comprising:

a preliminary wind-up information storing unit which stores preliminary wind-up information in connection with a number of repetitions of said preliminary wind-up operation performed with respect to one film unit.

35. The camera of claim 34, wherein said controller prohibits said preliminary wind-up operation with respect to a certain film unit when the number of repetitions of said preliminary wind-up operation performed with respect to said certain film unit reaches a predetermined number, according to said preliminary wind-up information stored in said preliminary wind-up information storing unit.

36. A camera capable of loading a film unit having a film with a plurality of frames, a cartridge in which said film is inserted and an information recording part, the camera including a photographed frame associating information recorder which records on said information recording part photographed frame associating information showing what frame of said film is already photographed, a photographed frame associating information reproducer which reproduces from said information recording part said photographed frame associating information recorded by said recorder, a film drive mechanism capable of performing a preliminary wind-up operation by which an unexposed frame to be photographed is at first extracted from said cartridge, after said film unit is loaded in said camera, to bring it to a photographing position, and a rewind operation by which said film extracted from said cartridge is rewound within said cartridge in order to take out said film unit from said camera, a rewind instructing part for producing an instruction signal for starting said rewind operation, a controller for controlling said recorder, said reproducer and said film drive mechanism and which allows said film drive mechanism to perform said preliminary wind-up operation based on said photographed frame associating information reproduced by said reproducer and allows said film drive mechanism to perform said rewind operation in response to said rewind instruction signal, the improvement comprising:

a preliminary wind-up information storing unit which stores preliminary wind-up information in connection with a number of repetitions of said preliminary wind-up operation performed with respect to one film unit.

37. The camera of claim 36, wherein said controller prohibits said preliminary wind-up operation with respect to a certain film unit when the number of repetitions of said preliminary wind-up operation performed with respect to said certain film unit reaches a predetermined number, according to said preliminary wind-up information stored in said preliminary wind-up information storing unit.

38. The camera of claim 36, wherein said information recording part of said film unit is provided on said cartridge.

39. A camera capable of loading a film unit having a film with a plurality of frames, a cartridge in which said film is inserted and an information recording part, comprising:

a film supply mechanism which operates in a supply mode in which said film is extracted from said cartridge frame-by-frame every photographing operation; and a recorder which records on said information recording part supply mode information used for said camera and showing that said film is supplied in said supply mode.

40. The camera of claim 39, further comprising a supply mode information reproducer which reads out said supply mode information from said information recording part.

41. The camera of claim 39, wherein said information recording part of said film unit is provided on said cartridge.

42. A camera capable of loading a film unit having a film with a plurality of frames, a cartridge in which said film is inserted and an information recording part, comprising:

a reproducer which reads out from said information recording part supply mode information showing that said film is extracted frame-by-frame from said cartridge every photographing operation.

43. The camera of claim 42, wherein said information recording part of said film unit is provided on said cartridge.

44. A camera capable of loading a film unit having a film with plural frames, a cartridge in which said film is inserted and an information recording part, comprising:

a film supply mechanism which operates in a supply mode in which said film is rewound frame-by-frame within said cartridge every photographing operation; and a recorder which records on said information recording part supply mode information used for said camera and showing that said film is supplied in said supply mode.

45. The camera of claim 44, further comprising a supply mode information reproducer which reads out from said information recording part said supply mode information.

46. The camera of claim 44, wherein said information recording part of said film unit is provided on said cartridge.

47. A camera capable of loading a film unit having a film with plural frames, a cartridge in which said film is inserted and an information recording part, comprising:

a reproducer which reads out from said information recording part supply mode information showing that said film is rewound within said cartridge frame-by-frame every photographing operation.

48. The camera of claim 47, wherein said information recording part of said film unit is provided on said cartridge.

\* \* \* \* \*